(12) United States Patent
Nakada et al.

(10) Patent No.: US 7,656,606 B2
(45) Date of Patent: Feb. 2, 2010

(54) MAGNETIC RECORDING MEDIUM, RECORDING/REPRODUCING APPARATUS, AND STAMPER

(75) Inventors: Kasuyuki Nakada, Tokyo (JP); Mitsuru Takai, Tokyo (JP); Kazuhiro Hattori, Tokyo (JP)

(73) Assignee: TDK Corporation, Tokyo (JP)

( * ) Notice: Subject to any disclaimer, the term of this patent is extended or adjusted under 35 U.S.C. 154(b) by 256 days.

(21) Appl. No.: 11/944,485

(22) Filed: Nov. 23, 2007

(65) Prior Publication Data

US 2008/0123209 A1    May 29, 2008

(30) Foreign Application Priority Data

Nov. 28, 2006    (JP) .............................. 2006-319485

(51) Int. Cl.
*G11B 5/596*    (2006.01)
(52) U.S. Cl. .................................................. 360/77.08
(58) Field of Classification Search ............. 360/77.08, 360/48, 77.02, 77.05, 78.04, 78.11, 99.08, 360/135, 235.6
See application file for complete search history.

(56) References Cited

U.S. PATENT DOCUMENTS

| | | | | |
|---|---|---|---|---|
| 3,508,729 A | * | 4/1970 | Wilson | 248/604 |
| 3,536,253 A | * | 10/1970 | Anderson et al. | 494/27 |
| 4,779,148 A | * | 10/1988 | Ozawa | 360/77.11 |
| 6,927,942 B2 | * | 8/2005 | Tani et al. | 360/235.6 |
| 6,965,492 B2 | * | 11/2005 | Obata et al. | 360/99.08 |
| 2005/0011767 A1 | | 1/2005 | Nakada et al. | |
| 2006/0012904 A1 | * | 1/2006 | Naruse et al. | 360/48 |
| 2006/0222899 A1 | | 10/2006 | Sugimura et al. | |
| 2007/0009655 A1 | | 1/2007 | Yamazaki et al. | |
| 2007/0026264 A1 | | 2/2007 | Kuwajima et al. | |
| 2007/0139804 A1 | | 6/2007 | Ito et al. | |
| 2007/0153409 A1 | | 7/2007 | Soeno | |

FOREIGN PATENT DOCUMENTS

JP    2006-277869    10/2006

OTHER PUBLICATIONS

English language Abstract of JP 2006-277869.

* cited by examiner

*Primary Examiner*—Fred Tzeng
(74) *Attorney, Agent, or Firm*—Greenblum & Bernstein, P.L.C.

(57) ABSTRACT

A rotary-type magnetic recording medium has servo patterns formed in servo pattern regions on a substrate by patterns including recording regions and non-recording regions. Burst signal units composed of the recording regions or the non-recording regions are formed in burst pattern regions in the servo pattern regions. The burst signal units are formed so that for at least one edge out of both edges along a direction of rotation of the magnetic recording medium, a center in the direction of rotation is positioned closer to the other edge than both ends in the direction of rotation, and a ratio of a length along a radial direction of the magnetic recording medium between both ends and the center of the one edge to a length along the radial direction between both ends of the one edge and both ends of the other edge is in a range of 0.2 or below.

12 Claims, 11 Drawing Sheets

FIG. 9

|  | L2/L1 | L2a/L1a | PES | JUDGEMENT OF FAVORABLE/POOR |
|---|---|---|---|---|
| EXAMPLE 1 | 0.052 | −0.064 | 0.71 | GOOD |
| EXAMPLE 2 | 0.098 | −0.010 | 0.59 | FAVORABLE |
| EXAMPLE 3 | 0.157 | 0.050 | 0.64 | FAVORABLE |
| EXAMPLE 4 | 0.197 | 0.090 | 0.90 | GOOD |
| COMPARATIVE EXAMPLE 1 | 0.000 | −0.117 | 1.00 | POOR |
| COMPARATIVE EXAMPLE 2 | 0.225 | 0.118 | 1.01 | POOR |
| COMPARATIVE EXAMPLE 3 | 0.248 | 0.139 | 1.26 | POOR |

FIG. 10

|  | L4/L3 | L4a/L3a | BURST OUTPUT | JUDGEMENT OF FAVORABLE/POOR |
|---|---|---|---|---|
| EXAMPLE 5 | 0.048 | −0.066 | 1.06 | GOOD |
| EXAMPLE 6 | 0.092 | −0.013 | 1.15 | FAVORABLE |
| EXAMPLE 7 | 0.149 | 0.047 | 1.18 | FAVORABLE |
| EXAMPLE 8 | 0.199 | 0.087 | 1.04 | GOOD |
| COMPARATIVE EXAMPLE 1 | 0.000 | −0.119 | 1.00 | POOR |
| COMPARATIVE EXAMPLE 4 | 0.225 | 0.118 | 0.99 | POOR |
| COMPARATIVE EXAMPLE 5 | 0.252 | 0.141 | 0.92 | POOR |

FIG. 11

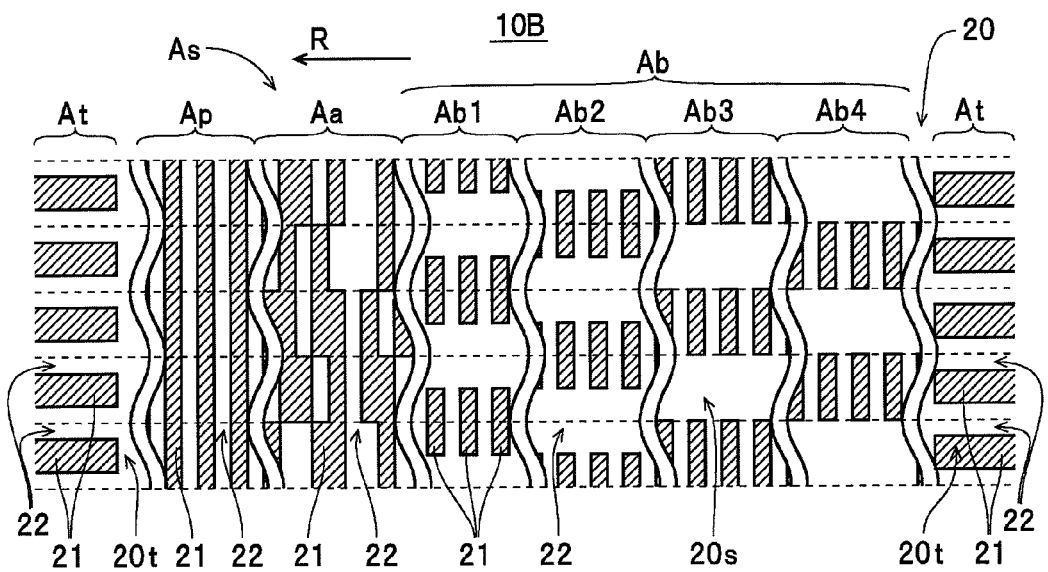

FIG. 15

| | L2/L1 | L2a/L1a | PES | JUDGEMENT OF FAVORABLE/POOR |
|---|---|---|---|---|
| EXAMPLE 9 | 0.050 | −0.060 | 0.69 | GOOD |
| EXAMPLE 10 | 0.101 | −0.008 | 0.56 | FAVORABLE |
| EXAMPLE 11 | 0.153 | 0.048 | 0.61 | FAVORABLE |
| EXAMPLE 12 | 0.200 | 0.089 | 0.89 | GOOD |
| COMPARATIVE EXAMPLE 6 | 0.000 | −0.119 | 1.00 | POOR |
| COMPARATIVE EXAMPLE 7 | 0.230 | 0.120 | 1.01 | POOR |
| COMPARATIVE EXAMPLE 8 | 0.246 | 0.138 | 1.24 | POOR |

FIG. 16

| | L4/L3 | L4a/L3a | BURST OUTPUT | JUDGEMENT OF FAVORABLE/POOR |
|---|---|---|---|---|
| EXAMPLE 13 | 0.044 | −0.065 | 1.07 | GOOD |
| EXAMPLE 14 | 0.093 | −0.012 | 1.15 | FAVORABLE |
| EXAMPLE 15 | 0.152 | 0.049 | 1.17 | FAVORABLE |
| EXAMPLE 16 | 0.198 | 0.086 | 1.04 | GOOD |
| COMPARATIVE EXAMPLE 6 | 0.000 | −0.121 | 1.00 | POOR |
| COMPARATIVE EXAMPLE 9 | 0.226 | 0.118 | 0.99 | POOR |
| COMPARATIVE EXAMPLE 10 | 0.256 | 0.143 | 0.91 | POOR |

MAGNETIC RECORDING MEDIUM, RECORDING/REPRODUCING APPARATUS, AND STAMPER

BACKGROUND OF THE INVENTION

1. Field of the Invention

The present invention relates to a rotary-type magnetic recording medium on which servo patterns are formed in servo pattern regions on at least one surface of a disk-shaped substrate by patterns including recording regions and non-recording regions, to a recording/reproducing apparatus that includes such magnetic recording medium, and to a stamper for manufacturing such magnetic recording medium.

2. Description of the Related Art

As one example of this type of magnetic recording medium, Japanese Laid-Open Patent Publication No. 2006-277869 discloses a discrete track medium where concave/convex patterns constructed by a ferromagnetic layer are formed in both servo regions (servo pattern regions) and data regions (data recording regions) and where concaves in the concave/convex patterns are filled with non-magnetic material so as to be smoothed as a whole. On the discrete track medium disclosed as a conventional magnetic disk in the above publication, data regions in which recording tracks are constructed by the convexes in the concave/convex patterns mentioned above and servo regions in which servo patterns are constructed by the concave/convex patterns mentioned above are defined so as to be alternately positioned in the direction of rotation of the discrete track medium. In each servo region, a preamble region (preamble pattern region), an address region (address pattern region), and burst regions (burst pattern regions) are defined so as to be adjacent in the direction of rotation of the discrete track medium. On the other hand, on a discrete track medium according to an embodiment of the invention disclosed in the publication, a data region is defined at at least one position out of a position between a preamble region and an address region, a position between the address region and the burst regions, and a position between an AB burst region and a CD burst region in the burst regions.

On the two discrete track media described above, burst patterns including a plurality of burst signal units (each of which is a concave that is recognized as "one non-recording region" in a burst region) that are rectangular in planar form (i.e., rectangular when viewed from above) are formed by concave/convex patterns in the burst regions. In the burst pattern formed in the AB burst region, the outer periphery-side edges of burst signal units formed in the A burst region and inner periphery-side edges of burst signal units formed in the B burst region are both linearly formed so that the distance from the center of the discrete track medium is equal, and inner periphery-side edges of burst signal units formed in the A burst region and outer periphery-side edges of burst signal units formed in the B burst region are both linearly formed so that the distance from the center is equal. In addition, in the burst pattern formed in the CD burst region, outer periphery-side edges of burst signal units formed in the C burst region and inner periphery-side edges of burst signal units formed in the D burst region are both linearly formed so that the distance from the center is equal, and inner periphery-side edges of burst signal units formed in the C burst region and outer periphery-side edges of burst signal units formed in the D burst region are both linearly formed so that the distance from the center is equal.

In the burst patterns formed in each burst region, a leading edge and a trailing edge in the direction of rotation of each burst signal unit are both linearly formed. On such discrete track media, the length along the direction of rotation of the burst signal units (i.e., concaves), or in other words, the distance between both edges along the radial direction of the discrete track medium, and the length along the direction of rotation of the gap (i.e., convex) between two burst signal units that are adjacent in the direction of rotation, or in other words, the distance between the leading edge of one burst signal unit and the trailing edge of another burst signal unit, are formed so as to be substantially 1:1.

SUMMARY OF THE INVENTION

However, by investigating the conventional discrete track media (hereinafter also referred to as "magnetic disks"), the present inventors found the following problem. On the conventional magnetic disks, the four edges of each burst signal unit that constructs a burst pattern are linearly formed. The present inventors found the following phenomenon for a magnetic disk 10aZ shown in FIG. 26 (hereinafter conventional magnetic disks and the component elements thereof are designated by appending the reference numerals with "Z"). When edges 22aZ to 22dZ of a concave 22Z that constructs a burst signal unit are linearly formed as in a concave/convex pattern 20Z inside the burst pattern region AbZ, as shown in FIG. 27, in a magnetic pattern 30Z (as one example, a pattern observed through an MFM (magnetic force microscope)) of such concave/convex pattern 20Z, each edge 32aZ to 32dZ of a non-magnetic region 32Z that constructs a burst signal unit becomes gradually more distant from its opposite edge from both ends thereof toward the center so that each edge 32aZ to 32dZ is rounded.

For modern magnetic disks, the pitch of the data recording tracks has become narrower and the recording and reproducing speeds have been raised. As a result, during recording and reproducing, highly precise tracking servo control that positions the magnetic head at a desired recording/reproducing position with high precision is now required. Accordingly, during recording and reproducing, it is necessary to read highly precise burst signals that make it possible to correctly specify the position of the magnetic head in the radial direction of the magnetic disk (i.e., burst signals that can sufficiently raise the following precision). However, in a state where both edges 32aZ, 32bZ along the direction of rotation (i.e., the direction of the arrow R) of the non-magnetic regions 32Z that construct the burst signal units are rounded in the magnetic pattern 30Z as on the conventional magnetic disk 10aZ, there will be a drop in the following precision due to the difficulty in obtaining a highly precise burst signal. This means that for the conventional magnetic disk 10aZ, there is the problem that it is difficult to carry out highly precise tracking servo control.

An extremely important element in realizing highly precise tracking servo control is the output level of the burst signal (i.e., the output level of the signal outputted from the reproducing head when reading a burst pattern). However, like the conventional magnetic disk 10aZ, in a state where both edges 32cZ, 32dZ along the radial direction (the up-down direction in FIG. 27) of the non-magnetic regions 32Z that construct the burst signal units are rounded in the magnetic pattern 30Z, the ratio of the length of the magnetic regions 31Z between non-magnetic regions 32Z that are adjacent in the direction of rotation (i.e., the length along the direction of rotation of the regions corresponding to the convexes 21Z between the concaves 22Z in FIG. 26) to the length of the non-magnetic regions 32Z along the direction of rotation of the magnetic disk 10aZ (i.e., a length along the direction of rotation of the regions recognized as burst signal units) will greatly differ to the desired ratio (as one example, 1:1). This means that when a burst pattern is read, since it is difficult to read the burst signal units in synchronization with a base clock for reading servo signals, it is difficult to obtain a burst signal with a sufficient output level. In this way, due to the low output level of the burst signal, there is a problem for the conventional magnetic disk $10aZ$ that highly precise tracking servo control is difficult. Note that the expression "magnetic regions" in the present specification refers to regions in a magnetic pattern that are recognized as having a magnetic field of a predetermined level or higher. Similarly, the expression "non-magnetic regions" in the present specification refers to regions recognized as having a magnetic field of a lower intensity than that of the magnetic regions described above, or regions that are recognized as effectively not having a magnetic field.

On the other hand, in place of the concave/convex pattern $20Z$ on the magnetic disk $10aZ$ described above, as shown in FIG. 28, there is also a magnetic disk $10bZ$ where a concave/convex pattern $20Z$ is formed in each burst pattern region $AbZ$ so that the burst signal units are constructed by convexes $21Z$ and the edges $21aZ$ to $21dZ$ of the convexes $21Z$ are linearly formed. However, the present inventors found the phenomenon described above also occurs for the magnetic disk $10bZ$. That is, like the magnetic disk $10aZ$ described above, as shown in FIG. 29, in the magnetic pattern $30Z$, each edge $31aZ$ to $31dZ$ of a magnetic region $31Z$ that constructs a burst signal unit is rounded so as to become gradually more distant from its opposite edge from both ends thereof toward the center. When both edges $31aZ$, $31bZ$ along the direction of rotation (i.e. the direction of the arrow R) of a magnetic region $31Z$ that constructs a burst signal unit are rounded in the magnetic pattern $30Z$ as on the magnetic disk $10bZ$, like the magnetic disk $10aZ$ described above, there will be a drop in the following precision due to the difficulty in obtaining a highly precise burst signal. This means that for the conventional magnetic disk $10bZ$, there is the problem that it is difficult to carry out highly precise tracking servo control.

Also, like the magnetic disk $10bZ$, in a state where both edges $31cZ$, $31dZ$ along the radial direction (the up-down direction in FIG. 29) of the magnetic regions $31Z$ that construct the burst signal units are rounded in the magnetic pattern $30Z$, the ratio of the length of the non-magnetic regions $32Z$ between magnetic regions $31Z$ that are adjacent in the direction of rotation (i.e., the length along the direction of rotation of the regions corresponding to the concaves $22Z$ between the convexes $21Z$ in FIG. 28) to the length of the magnetic regions $31Z$ along the direction of rotation of the magnetic disk $10bZ$ (i.e., a length along the direction of rotation of the regions recognized as burst signal units) will greatly differ to the desired ratio (as one example, 1:1). This means that like the magnetic disk $10aZ$, when the burst patterns are read, since it is difficult to read the burst signal units in synchronization with a base clock for reading servo signals, it is difficult to obtain a burst signal with a sufficient output level. In this way, due to the low output level of the burst signal, there is a problem for the conventional magnetic disk $10bZ$ that highly precise tracking servo control is difficult.

The present invention was conceived in view of the problem described above and it is a principal object of the present invention to provide a magnetic recording medium that can realize highly precise tracking servo control, a recording/reproducing apparatus equipped with such magnetic recording medium, and a stamper capable of manufacturing such magnetic recording medium.

On a rotary-type magnetic recording medium according to the present invention, servo patterns are formed in servo pattern regions on at least one surface of a disk-shaped substrate by patterns including recording regions and non-recording regions, wherein a plurality of burst signal units that are composed of one of the recording regions and the non-recording regions are formed in burst pattern regions in the servo pattern regions, and the burst signal units are formed so that for at least one edge out of both edges along a direction of rotation of the magnetic recording medium, a center in the direction of rotation is positioned closer to the other edge than both ends in the direction of rotation, and a ratio of a length along a radial direction of the magnetic recording medium between both ends and the center of the one edge to a length along the radial direction between both ends of the one edge and both ends of the other edge is in a range of 0.2 or below. Here, the burst signal units may be composed of the recording regions. Also, the burst signal units may be composed of the non-recording regions.

The expression "recording regions" in the present specification refers to regions that are constructed so as to hold a recorded magnetic signal in a readable manner (that is, regions constructed so as to have the ability to hold a magnetic signal in a readable manner). Similarly, the expression "non-recording regions" in the present specification refers to regions that are constructed so that an ability thereof to hold a recorded magnetic signal in a readable manner is lower than that of the recording regions, or regions constructed so as not to effectively have such ability. More specifically, the expression "non-recording regions" in the present specification refers to regions that emit a smaller magnetic field than that from the recording regions described above in a state where a magnetic signal has been recorded, or regions that effectively do not emit a magnetic field. In addition, a state where one edge is formed so that a center thereof is positioned closer than both ends thereof to the other edge in the present specification refers to a state where one edge is formed so that a center thereof is depressed inward toward the other edge or a state where one edge is formed so that both ends thereof protrude outward so as to become distant from the other edge.

On this magnetic recording medium, the burst signal units are formed of one of the recording regions and the non-recording regions so that for at least one edge out of both edges along the direction of rotation, a center in the direction of rotation is positioned closer to the other edge than both ends in the direction of rotation, and a ratio of a length along a radial direction of the magnetic recording medium between both ends and a center of the one edge to a length along the radial direction between both ends of the one edge and both ends of the other edge is in a range of 0.2 or below. By doing so, according to this magnetic recording medium, since it is possible to avoid a situation where both direction-of-rotation-side edges of the magnetic regions that construct the burst signal units in the magnetic pattern (where the burst signal units are composed of the recording regions) and both direction-of-rotation-side edges of the non-magnetic regions that construct the burst signal units in the magnetic pattern (where the burst signal units are composed of the non-recording regions) become rounded, such edges can be made much straighter. Therefore, according to this magnetic recording medium, it is possible to obtain a burst signal of sufficiently high precision. As a result, it is possible to sufficiently improve the following precision, and therefore possible to carry out highly precise tracking servo control.

On yet another rotary-type magnetic recording medium according to the present invention, servo patterns are formed in servo pattern regions on at least one surface of a disk-shaped substrate by patterns including recording regions and non-recording regions, wherein a plurality of burst signal units that are composed of one of the recording regions and the non-recording regions are formed in burst pattern regions in the servo pattern regions, and the burst signal units are formed so that for at least one edge out of both edges along a radial direction of the magnetic recording medium, a center in the radial direction is positioned closer to the other edge than both ends in the radial direction, and a ratio of a length along a direction of rotation of the magnetic recording medium between both ends and the center of the one edge to a length along the direction of rotation between both ends of the one edge and both ends of the other edge is in a range of 0.2 or below. Here, the burst signal units may be composed of the recording regions. Also, the burst signal units may be composed of the non-recording regions.

On this magnetic recording medium, the burst signal units are formed of one of the recording regions and the non-recording regions so that for at least one edge out of both edges along the radial direction, a center in the radial direction is positioned closer to the other edge than both ends in the radial direction, and a ratio of a length along a direction of rotation of the magnetic recording medium between both ends and a center of the one edge to a length along the direction of rotation between both ends of the one edge and both ends of the other edge is in a range of 0.2 or below. By doing so, according to this magnetic recording medium, since it is possible to avoid a situation where both radial-direction-side edges of the magnetic regions that construct the burst signal units in the magnetic pattern (where the burst signal units are composed of the recording regions) and both radial-direction-side edges of the non-magnetic regions that construct the burst signal units in the magnetic pattern (where the burst signal units are composed of the non-recording regions) become rounded, such edges can be made much straighter. Therefore, according to this magnetic recording medium, it is possible to reliably read the burst signal units in synchronization with a base clock for reading servo signals. As a result, it is possible to obtain a burst signal with a sufficiently high output level and therefore possible to carry out highly precise tracking servo control.

Here, the burst signal units may be formed so that the one edge gradually approaches the other edge from both ends thereof toward the center thereof. With this construction, unlike for example a construction where parts closer to the ends than the center of the one edge described above are linearly formed in the same way as on a conventional magnetic disk and only the center of the one edge is closer to the opposite edge, it is possible to avoid a situation where the corresponding edge in a magnetic pattern is not straight due to parts closer to the ends than the center of such edge in the magnetic pattern being positioned further apart from the opposite edge. This means that the straightness of the edges in the magnetic pattern can be reliably improved.

A recording/reproducing apparatus according to the present invention includes any of the magnetic recording media described above and a control unit that executes a tracking servo control process based on a servo signal read from the servo pattern regions of the magnetic recording medium.

This recording/reproducing apparatus includes any of the magnetic recording media described above and a control unit that executes a tracking servo control process based on a servo signal read from the servo pattern regions of the magnetic recording medium. This means that according to this recording/reproducing apparatus, it is possible to achieve the same effects as those of the magnetic recording media described above.

In addition, a stamper for manufacturing a magnetic recording medium according to the present invention has a concave/convex pattern with concaves formed corresponding to the recording regions in the patterns of any of the magnetic recording media described above and convexes formed corresponding to the non-recording regions in the patterns formed thereon.

On this stamper, a concave/convex pattern with concaves formed corresponding to the recording regions in the patterns of any of the magnetic recording media described above and convexes formed corresponding to the non-recording regions in the patterns of such magnetic recording medium is formed. This means that it is possible to easily manufacture, by imprinting or the like, a magnetic recording medium where the edges of the regions (magnetic regions or non-magnetic regions) that construct the burst signal units in the magnetic pattern are sufficiently straight.

It should be noted that the disclosure of the present invention relates to a content of Japanese Patent Application 2006-319485 that was filed on 28 Nov. 2006 and the entire content of which is herein incorporated by reference.

BRIEF DESCRIPTION OF THE DRAWINGS

These and other objects and features of the present invention will be explained in more detail below with reference to the attached drawings, wherein:

FIG. 9 is a table useful in explaining the relationship between the shape of the burst signal units and the following precision of a magnetic disk;

FIG. 10 is a table useful in explaining the relationship between the shape of the burst signal units and the output level of burst signals;

FIG. 11 is a plan view of data recording regions and a servo pattern region on a magnetic disk;

FIG. 15 is a table useful in explaining the relationship between the shape of the burst signal units and the following precision of a magnetic disk;

FIG. 16 is a table useful in explaining the relationship between the shape of the burst signal units and the output level of burst signals;

DESCRIPTION OF THE PREFERRED EMBODIMENTS

Preferred embodiments of a magnetic recording medium, a recording/reproducing apparatus, and a stamper according to the present invention will now be described with reference to the attached drawings.

First, the construction of a recording/reproducing apparatus according to the present invention will be described with reference to the drawings.

Figure 1:
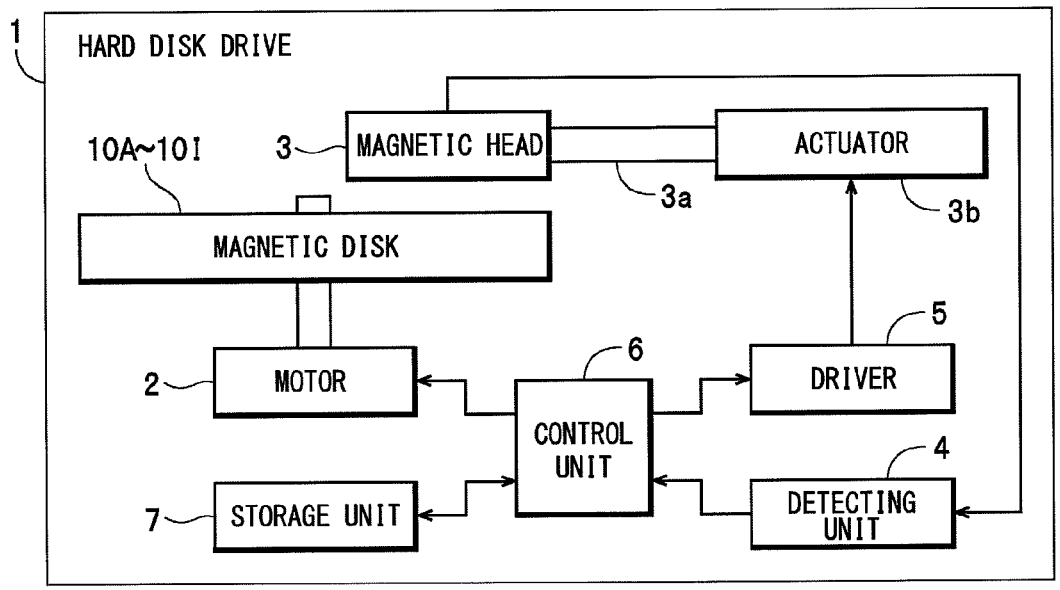
FIG. 1 is a schematic diagram showing the construction of a hard disk drive.

A hard disk drive 1 shown in FIG. 1 is one example of a "recording/reproducing apparatus" according to the present invention, includes a motor 2, a magnetic head 3, a detecting unit 4, a driver 5, a control unit 6, a storage unit 7, and a magnetic disk 10A, and is constructed so as to be capable of recording and reproducing various kinds of data. Here, the magnetic disk 10A is a discrete track medium (one example of a patterned medium) as one example of a "magnetic recording medium" according to the present invention, and as described later, the magnetic disk 10A is formed in an overall disk shape and is attached to a rotation shaft of the motor 2. According to control by the control unit 6, the motor 2 rotates the magnetic disk 10A at a fixed velocity, for example, 7200 rpm.

The magnetic head 3 is attached via a swing arm 3a to an actuator 3b. During the recording and reproducing of data on the magnetic disk 10A, the magnetic head 3 is moved over the magnetic disk 10A by rotating the swing arm 3a using the actuator 3b. The magnetic head 3 also carries out reads of servo data from a servo pattern region As (see FIGS. 2, 4) of the magnetic disk 10A, magnetic writes of data in a data recording region At (see FIGS. 2, 4), and reads of recorded data that has been magnetically written in a data recording region At. Note that although the magnetic head 3 is actually constructed by forming a recording element and a reproducing element on the bottom surface (air bearing surface) of a slider that causes the magnetic head 3 to fly above the magnetic disk 10A, the slider, the recording element, the reproducing element, and the like are omitted from the description and the drawings. According to a driving current supplied from the driver 5 under the control of the control unit 6, the actuator 3b swings the swing arm 3a to move the magnetic head 3 to a freely chosen recording/reproducing position on the magnetic disk 10A.

The detector unit 4 obtains (detects) servo data from an output signal (analog signal or servo signal) outputted by the magnetic head 3 and outputs the servo data to the control unit 6. The driver 5 controls the actuator 3b in accordance with a control signal outputted from the control unit 6 to make the magnetic head 3 on-track to a desired data recording track. The control unit 6 carries out overall control over the hard disk drive 1. The control unit 6 is one example of a "control unit" for the present invention and controls the driver 5 (i.e., the control unit 6 carries out a tracking servo control process) based on the servo data (one example of a "servo signal read from a servo pattern region") outputted from the detecting unit 4 and servo control data stored in the storage unit 7. The storage unit 7 stores an operation program of the control unit 6, the servo control data described above, and the like.

Figure 3:
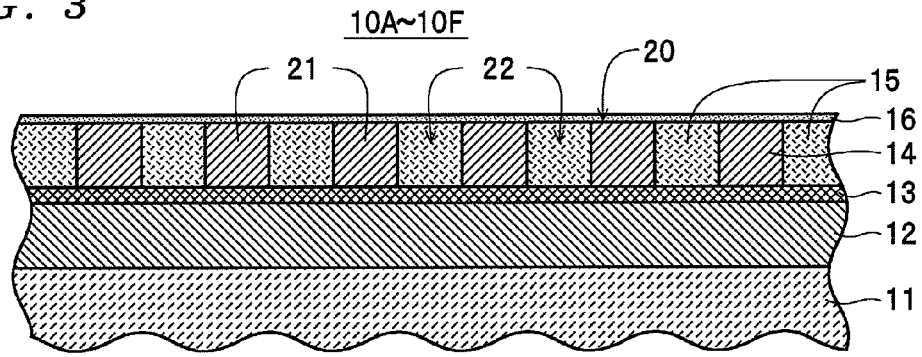
FIG. 3 is a cross-sectional view of a magnetic disk.

The magnetic disk 10A is installed inside the case of the hard disk drive 1 together with the motor 2, the magnetic head 3, and the like. As shown in FIG. 3, the magnetic disk 10A is constructed by forming a soft magnetic layer 12, an intermediate layer 13, and a magnetic layer 14 in the mentioned order on a glass substrate 11, and as one example can have data recorded thereon using a perpendicular recording method. As one example, the magnetic layer 14 constructs a concave/convex pattern 20 in which are formed a plurality of convexes 21, protruding end parts (the upper end parts in FIG. 3) of which are formed of magnetic material, and concaves 22 located between adjacent convexes 21. Also, the concaves 22 in the concave/convex pattern 20 are filled with non-magnetic material 15 such as $SiO_2$ to smooth the surface of the magnetic disk 10A. On the magnetic disk 10A, the formation regions of the convexes 21 correspond to "recording regions" for the present invention and the formation regions of the concaves 22 correspond to "non-recording regions" for the present invention. In addition, on the magnetic disk 10A, a protective layer 16 (a DLC film) with a thickness of around 2 nm is formed of diamond-like carbon (DLC) or the like so as to cover the surfaces of the non-magnetic material 15 filled in the concaves 22 (i.e. filled between the adjacent convexes 21) and the magnetic layer 14 (the convexes 21). A lubricant (as one example, a Fomblin lubricant) is also applied onto the surface of the protective layer 16 to prevent damage to both the magnetic head 3 and the magnetic disk 10A.

The glass substrate 11 corresponds to a "substrate" for the present invention and is formed in a disk-like shape with a thickness of around 0.6 mm by polishing the surface of a glass plate. Note that the "substrate" for the present invention is not limited to a glass substrate and it is possible to use a substrate formed in a disk-like shape using various types of non-magnetic material such as aluminum and ceramics. The soft magnetic layer 12 is formed as a thin film with a thickness of around 100 nm to 200 nm by sputtering a soft magnetic material such as CoZrNb alloy. The intermediate layer 13 functions as an underlayer for forming the magnetic layer 14 and is formed as a thin film with a thickness of around 40 nm by sputtering an intermediate layer forming material such as Cr or a non-magnetic CoCr alloy. As described earlier, the magnetic layer 14 is a layer that constructs the concave/convex pattern 20 (the data track patterns 20t and the servo patterns 20s shown in FIG. 4) and the concaves 22 are formed by etching a layer produced by sputtering CoCrPt alloy, for example.

Figure 2:
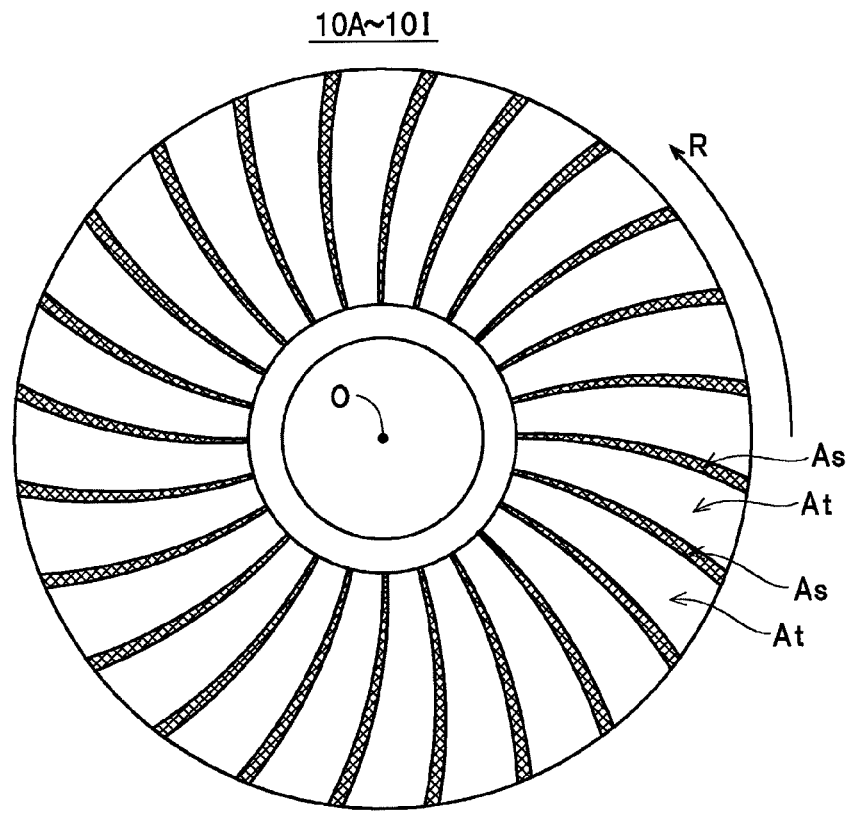
FIG. 2 is a plan view of a magnetic disk.

As shown in FIG. 2, on the magnetic disk 10A, the servo pattern regions As are provided between the data recording regions At and are set so that the data recording region At and the servo pattern region As are alternately disposed in the direction of rotation of the magnetic disk 10A (i.e., the direction of the arrow R). Note that in the present specification, each region sandwiched by two data recording regions At aligned in the direction of rotation (i.e., each region from a trailing end in the direction of rotation of a data recording region At to a leading end in the direction of rotation of the next data recording region At) is regarded as a servo pattern region As. Also, the ends in the direction of rotation of the data recording regions At are set as coinciding with virtual segments (linear or arc-like segments along the radial direction of the magnetic disk 10A) that join the respective ends in the direction of rotation of a plurality of data recording tracks (the convexes 21) formed in the data recording regions At.

The hard disk drive 1 equipped with the magnetic disk 10A is constructed so that the magnetic disk 10A is rotated at a fixed angular velocity by the motor 2 in accordance with control by the control unit 6 as described earlier. Accordingly, as shown in FIG. 2, on the magnetic disk 10A, the length of each data recording region At along the direction of rotation of the magnetic disk 10A and the length of each servo pattern region As along the direction of rotation are set so as to increase as the distance from the center O of the data track patterns 20t increases (i.e., the data recording regions At and the servo pattern regions As are set so as to widen from an inner periphery region toward an outer periphery region) in proportion to the length of a part of the magnetic disk 10A that passes below the magnetic head 3 per unit time. As a result, the length along the direction of rotation of the protruding end surfaces of the data recording tracks (the convexes 21) formed inside the data recording regions At, the standard length along the direction of rotation of the protruding end surfaces of the convexes 21 used in a servo pattern 20s formed inside the servo pattern regions As, and the standard gap length (i.e., the length of a gap between facing ends of the protruding end surfaces of two adjacent convexes 21: for example a length corresponding to the unitary signal length) along the direction of rotation of the concaves 22 used in the servo pattern 20s are set so as to increase from the inner periphery region toward the outer periphery region of the magnetic disk 10A. Note that in the following description, the gap length of the concaves is also referred to as the "length of the concaves".

Figure 4:
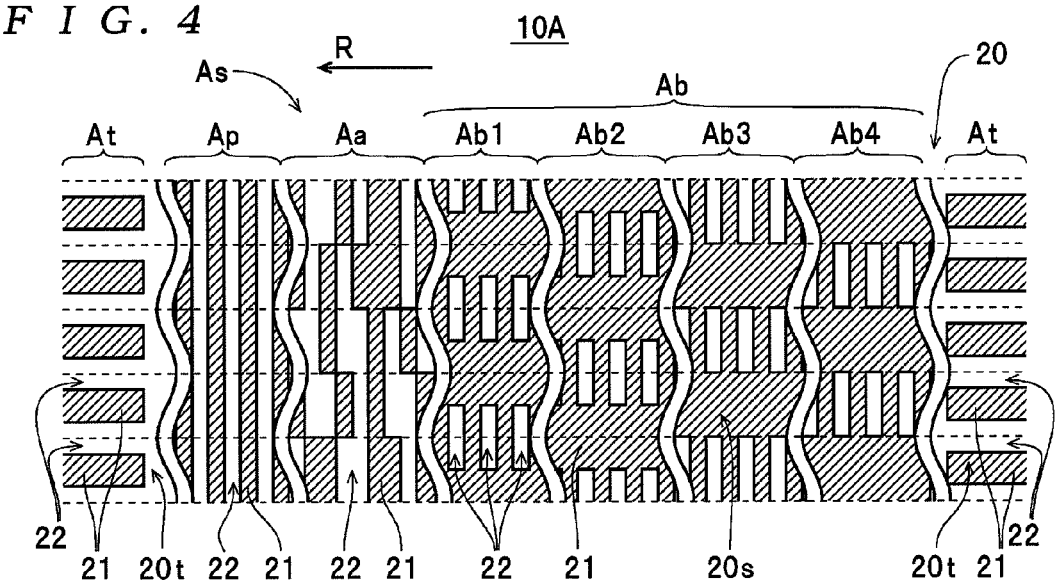
FIG. 4 is a plan view of data recording regions and a servo pattern region on the magnetic disk.

Also, as shown in FIG. 4, a data track pattern 20t is formed in each data recording region At. Note that the obliquely shaded regions in FIG. 4 and in FIGS. 5, 11, 12, 17, 18, 20, and 21 described later show formation positions of the convexes 21 ("recording regions" for the present invention) in the concave/convex patterns 20. In this example, the data track patterns 20t inside the data recording regions At are composed of a plurality of convexes 21 (belt-shaped convexes 21 that extend in the direction of rotation and are continuously formed along the direction of rotation of the magnetic disk 10A) that construct a large number of data recording tracks that are concentric or spiral about the center O (see FIG. 2) and are disposed a predetermined pitch apart, and a plurality of concaves 22 (the concaves 22 between the convexes 21 or "inter-track concaves") that construct guard band parts. As one example, the convexes 21 and the concaves 22 inside the data recording regions At are set so that the respective lengths thereof along the radial direction are substantially equal and formed so that the formation pitch of the convexes 21 (that is, the track pitch of the data recording tracks) and the length of the convexes 21 in the radial direction of the magnetic disk 10A (that is the lengths in the radial direction of the data recording tracks and the guard band parts) are substantially equal across the entire range from the inner periphery of the magnetic disk 10A to the outer periphery.

Note that although it is preferable for the center of rotation of the magnetic disk 10A and the center O of the data track patterns 20t to match, there is the risk of a minute displacement of 30 μm to 50 μm being caused between the center of rotation of the magnetic disk 10A and the center O of the data track patterns 20t due to manufacturing error. However, since tracking servo control can still be performed sufficiently for the magnetic head 3 when a displacement of such magnitude is present, the center of rotation and the center O can be thought of as effectively matching.

On the other hand, in each servo pattern region As, the concave/convex pattern 20 (i.e., the servo pattern 20s) includes a plurality of convexes 21 and a plurality of concaves 22 that construct various servo patterns for tracking servo control. More specifically, a preamble pattern region Ap in which a preamble pattern is formed by the servo pattern 20s, an address pattern region Aa in which an address pattern is formed by the servo pattern 20s, and a burst pattern region Ab in which burst patterns are formed by the servo pattern 20s are defined inside each servo pattern region As. Four regions Ab1 to Ab4 corresponding to signal regions of the burst patterns are defined inside the burst pattern region Ab.

The preamble pattern formed in the preamble pattern region Ap is a servo pattern for correcting a base clock, which is used when reading various types of control signal from the address pattern region Aa, the burst pattern region Ab, and the like, in accordance with the rotational state (rotational velocity) of the magnetic disk 10. In the preamble pattern, a plurality of belt-shape convexes 21 that extend in the radial direction (the up-down direction in FIG. 4) of the magnetic disk 10A are formed along the direction of rotation (the direction of the arrow R) of the magnetic disk 10A with concaves 22 in between. Here, the lengths in the direction of rotation of the convexes 21 and the lengths in the direction of rotation of the concaves 22 formed in the preamble pattern region Ap are set equal at positions with the same radius where the distance from the center O is the same and so as to increase from the inner periphery region of the magnetic disk 10A toward the outer periphery region of the magnetic disk 10A.

The address pattern formed in each address pattern region Aa is a servo pattern formed corresponding to address data showing the track number of the track on which the magnetic head 3 is being made on-track and the sector number of the sector at which the magnetic head 3 is positioned. In the address pattern, the respective lengths in the direction of rotation of the convexes 21 and the lengths in the direction of rotation of the concaves 22 are set corresponding to such address data. The burst patterns formed in each burst pattern region Ab are patterns for obtaining a burst pattern for correcting the position of the magnetic head 3 above the magnetic disk 10A (i.e., position-detecting servo patterns). On the magnetic disk 10A, the burst patterns are formed of a plurality of concaves 22 that are rectangular in planar form and are formed inside each of four burst regions from a first burst region Ab1 to a fourth burst region Ab4. Note that in reality, although the concaves 22 are parallelograms with concaves 22 in an inner periphery region and an outer periphery region of the magnetic disk 10A being given skew angles, for ease of understanding the present invention, the skew angles have been omitted from the description and drawings.

Figure 5:
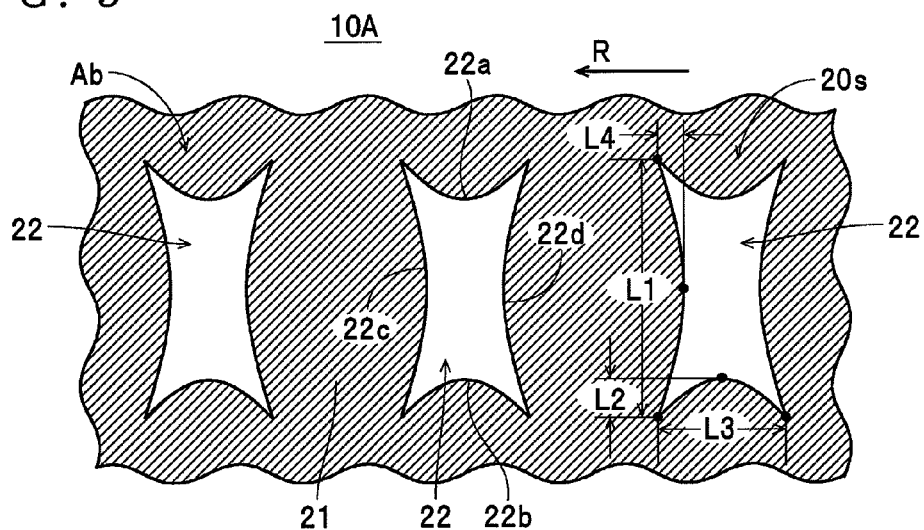
FIG. 5 is a plan view of a burst pattern region on the magnetic disk.

On the magnetic disk 10A, the concaves 22 inside the burst regions Ab1 to Ab4 in a burst pattern region Ab respectively construct "burst signal units" for the present invention. As shown in FIG. 5, the concaves 22 inside the burst regions Ab1 to Ab4 are formed so that both edges 22a, 22b on the sides along the direction of rotation of the magnetic disk 10A (i.e., the direction of the arrow R in FIG. 5) are arc-shaped in planar form (parabolic in planar form) and both edges 22c, 22d on the sides along the radial direction of the magnetic disk 10A (i.e., the up-down direction in FIG. 5) are arc-shaped in planar form.

More specifically, one edge 22a out of both direction-of-rotation-side edges 22a, 22b is formed so as to gradually approach the other edge 22b from both ends in the direction of rotation toward the center so that the center in the direction of rotation is positioned closer to the other edge 22b than both ends in the direction of rotation. The other edge 22b out of both direction-of-rotation-side edges 22a, 22b is also formed so as to gradually approach the other edge 22a from both ends in the direction of rotation toward the center so that the center in the direction of rotation is positioned closer to the edge 22a than both ends in the direction of rotation. In addition, one edge 22c out of both edges 22c, 22d along the radial direction is formed so as to gradually approach the other edge 22d from both ends in the radial direction toward the center so that the center in the radial direction is positioned closer to the edge 22d than both ends in the radial direction. The other edge 22d out of both edges 22c, 22d along the radial direction is formed so as to gradually approach the other edge 22c from both ends in the radial direction toward the center so that the center in the radial direction is positioned closer to the edge 22c than both ends in the radial direction. Note that the structure for making one edge gradually approach the other edge from both ends thereof toward the center is not limited to a structure where the edge is arc-shaped in planar form as described above and it is possible to use a construction (not shown) where the edge is formed in a "V" shape in planar form.

As one example, for the concaves 22 in the burst regions Ab1 to Ab4, the length L1 in the radial direction corresponds to one track pitch of the data recording tracks and the length L3 in the direction of rotation is formed substantially equal to the length in the direction of rotation of the concaves 22 inside the preamble pattern regions Ap at a position with the same radius. As a result, on the magnetic disk 10A, the length L1 in the radial direction of the concaves 22 is equal to the length in the radial direction of the concaves 22Z inside the burst pattern region AbZ of the conventional magnetic disk 10bZ (the concaves 22Z that construct the burst signal units on the conventional magnetic disk 10bZ) and the length L3 in the direction of rotation of the concaves 22 is equal to the length in the direction of rotation of the concaves 22Z inside the burst pattern region AbZ of the conventional magnetic disk 10bZ (the concaves 22Z that construct the burst signal units on the conventional magnetic disk 10bZ).

The concaves 22 inside the burst regions Ab1 to Ab4 are formed so that the ratio of the length L2 along the radial direction between (i) both ends in the direction of rotation of the direction-of-rotation-side edges 22a, 22b and (ii) centers thereof in the direction of rotation to the length L1 along the radial direction of the radial-direction-side edges 22c, 22d (i.e., the distance between both ends in the radial direction) is 0.098 (i.e., one example value in a range of 0.2 or below). In addition, the concaves 22 inside the burst regions Ab1 to Ab4 are formed so that the ratio of the length L4 along the direction of rotation between (i) both ends in the radial direction of the radial-direction-side edges 22c, 22d and (ii) centers thereof in the radial direction to the length L3 along the direction of rotation of the direction-of-rotation-side edges 22a, 22b (i.e., the distance between both ends in the direction of rotation) is 0.149 (one example value in a range of 0.2 or below).

Figure 6:
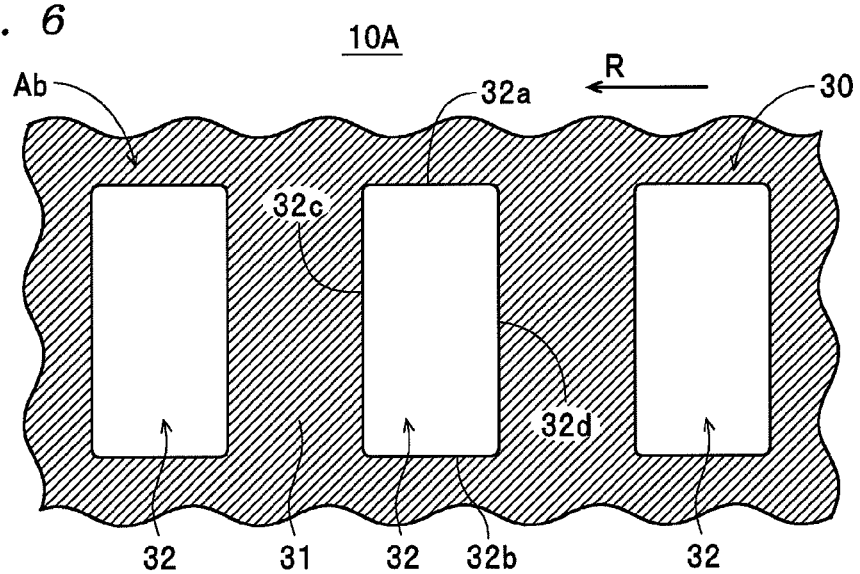
FIG. 6 is a pattern diagram showing the magnetic pattern in a burst pattern region on the magnetic disk.

By doing so, as shown in FIG. 6, in a magnetic pattern 30 (as one example, a pattern observed using an MFM (magnetic force microscope)) of the burst pattern regions Ab on the magnetic disk 10A, the edges 32a to 32d of the non-magnetic regions 32 corresponding to the concaves 22 were substantially linear without being rounded, so that the respective burst signal units (in this example, the non-magnetic regions 32) were rectangular in planar form. Since both direction-of-rotation-side edges 32a, 32b of the non-magnetic regions 32 are linear on the magnetic disk 10A, as described later, it is possible to obtain highly precise burst signals that can sufficiently raise the following precision. Also, on the magnetic disk 10A, since both radial-direction-side edges 32c, 32d of the non-magnetic regions 32 are linear, the length along the direction of rotation of the burst signal units (the non-magnetic regions 32) and the length along the direction of rotation of the regions (i.e., the magnetic regions 31) between burst signal units that are adjacent in the direction of rotation have a desired ratio (in this example, substantially 1:1). By doing so, as described later, it is possible to obtain a burst signal with a sufficiently high output level.

Next, the method of manufacturing the magnetic disk 10A will be described.

Figure 7:
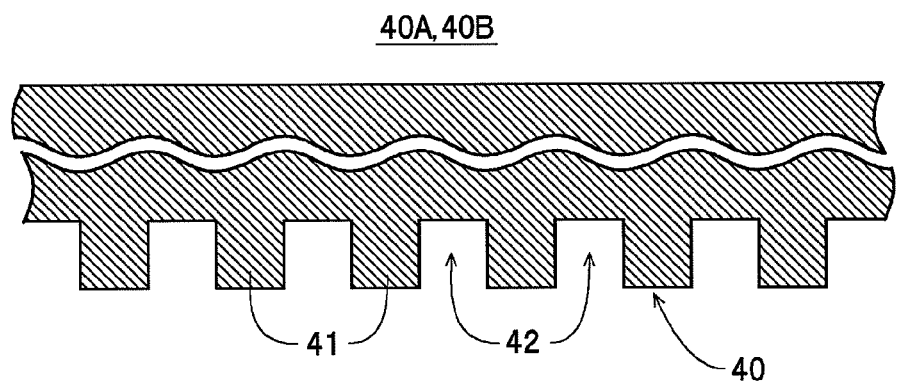
FIG. 7 is a cross-sectional view of a stamper.
Figure 8:
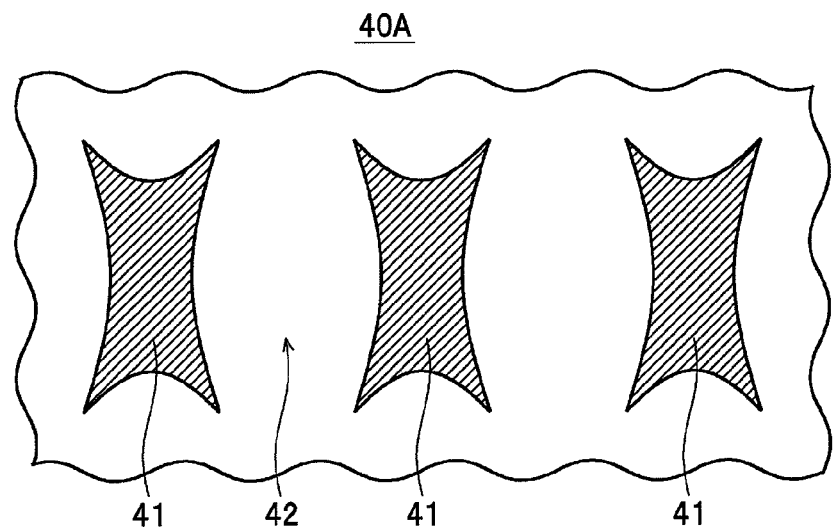
FIG. 8 is a plan view of a region on the stamper that corresponds to a burst pattern region.

When manufacturing the magnetic disk 10A described above, a preform (not shown), where the soft magnetic layer 12, the intermediate layer 13, the magnetic layer 14, and the like have been laminated in the mentioned order on the glass substrate 11, and a stamper 40A shown in FIGS. 7, 8 are used. The preform used to manufacture the magnetic disk 10A is constructed with a metal mask layer (not shown), and a resin mask layer (or "resist layer", also not shown) with a thickness of around 80 nm, formed on the magnetic layer 14. On the other hand, the stamper 40A is one example of a "stamper for manufacturing a magnetic recording medium" according to the present invention and as shown in FIG. 7 is constructed by forming a concave/convex pattern 40 that can form a mask pattern (a concave/convex pattern: not shown) for forming the concave/convex pattern 20 (the data track patterns 20t and the servo patterns 20s) of the magnetic disk 10A in a resin mask layer so as to be capable of manufacturing the magnetic disk 10A by an imprinting method.

In this case, the concave/convex pattern 40 of the stamper 40A is formed so as to correspond to the concave/convex pattern 20 of the magnetic disk 10A. More specifically, in the concave/convex pattern 40, the convexes 41 are formed corresponding to the concaves 22 in the concave/convex pattern 20 of the magnetic disk 10A and the concaves 42 are formed corresponding to the convexes 21 in the concave/convex pattern 20 of the magnetic disk 10A. Accordingly, as shown in FIG. 8, on the stamper 40A, in a region corresponding to a burst pattern region Ab on the magnetic disk 10A, the concaves 42 corresponding to the convexes 21 in the burst pattern region Ab of the magnetic disk 10A and the convexes 41 corresponding to the concaves 22 in the burst pattern region Ab are formed. Note that there are no particular limitations on the method of manufacturing the stamper 40A and it is possible to manufacture the stamper 40A according to various well-known methods of manufacturing a stamper.

When manufacturing the magnetic disk 10A using the stamper 40A, first the concave/convex pattern 40 of the stamper 40A is transferred to the resin mask layer of the preform by imprinting. More specifically, by pressing the surface of the stamper 40A on which the concave/convex pattern 40 is formed onto the resin mask layer of the preform, the convexes 41 of the concave/convex pattern 40 are pressed into the resin mask layer of the preform. When doing so, the resist (resin mask layer) at positions where the convexes 41 are pressed in moves inside the concaves 42 of the concave/convex pattern 40. After doing so, the stamper 40A is separated from the preform and by carrying out an oxygen plasma process to remove resin (or "residue": not shown) remaining on the base surfaces, a concave/convex pattern (resin mask pattern) composed of the resin mask layer is formed on the metal mask layer of the preform.

Next, by carrying out an etching process using the resin mask pattern described above as a mask, the metal mask layer is etched to form a concave/convex pattern (metal mask pattern) composed of the metal mask layer on the magnetic layer 14. After this, by carrying out an etching process with the metal mask pattern as a mask, the magnetic layer 14 is etched to form the concave/convex pattern 20 including the plurality of convexes 21 and the plurality of concaves 22 in the magnetic layer 14 of the preform. By doing so, the data track patterns 20t and the servo patterns 20s (i.e., the concave/convex pattern 20) are formed on the intermediate layer 13. Next, by carrying out an etching process to selectively remove the metal mask layer remaining on the convexes 21, the protruding end surfaces of the convexes 21 are exposed.

Next, $SiO_2$ is sputtered as the non-magnetic material 15 to cover the surface on which the concave/convex pattern 20 is formed with the non-magnetic material 15. After this, ion beam etching is carried out on the layer of the non-magnetic material 15 on the magnetic layer 14 (i.e., on the convexes 21 and on the concaves 22). When doing so, as one example, the ion beam etching continues until the protruding end surfaces of the convexes 21 in the outer periphery of the preform (the parts that will later become the outer periphery region of the magnetic disk 10A) are exposed from the non-magnetic material 15. By doing so, the surface of the preform is smoothed. Next, after the protective layer 16 has been formed by forming a thin film of diamond-like carbon (DLC) by CVD so as to cover the surface of the preform, a Fomblin lubricant is applied to the surface of the protective layer 16 with an average thickness of around 2 nm, for example. By doing so, as shown in FIG. 3, the magnetic disk 10A is completed.

Next, the relationship between the shapes of the concaves 22 (the non-recording regions that construct the burst signal units) inside a burst pattern region Ab and the following precision will be described with reference to the drawings.

Magnetic disks of Examples 1 to 4 and Comparative Examples 2 and 3 were manufactured so that for the concaves 22 (non-recording regions) that construct the burst signal units, as one example, both radial-direction-side edges 22c, 22d were linearly formed in the same way as on the conventional magnetic disk 10aZ and both direction-of-rotation-side edges 22a, 22b were arc-shaped in planar form (parabolic in planar form) in the same way as on the magnetic disk 10A described earlier. Also, magnetic disks of Comparative Example 1 were manufactured by linearly forming the edges 22a to 22d of the concaves 22 (non-recording regions) that construct the burst signal units in the same way as on the conventional magnetic disk 10aZ.

As shown in FIG. 9, on the magnetic disks of Example 1, both direction-of-rotation-side edges 22a, 22b were formed so that the ratio of the length L2 along the radial direction between both ends of a first edge out of the edges 22a, 22b and the center to the length L1 along the radial direction between both ends of the first edge and both ends of a second edge out of the edges 22a, 22b (i.e., a value produced by dividing the length L2 by the length L1) was 0.052 (one example value "in a range of 0.2 or below"). On the magnetic disks of Example 2, both edges 22a, 22b were formed so that the ratio of the length L2 to the length L1 described above was 0.098 (another example value "in a range of 0.2 or below"). On the magnetic disks of Example 3, both edges 22a, 22b were formed so that the ratio of the length L2 to the length L1 described above was 0.157 (another example value "in a range of 0.2 or below"). Also, on the magnetic disks of Example 4, both edges 22a, 22b were formed so that the ratio of the length L2 to the length L1 described above was 0.197 (another example value "in a range of 0.2 or below").

On the magnetic disks of Comparative Example 2, both edges 22a, 22b were formed so that the ratio of the length L2 to the length L1 described above was 0.225 (one example value "outside the range of 0.2 or below"). On the magnetic disks of Comparative Example 3, both edges 22a, 22b were formed so that the ratio of the length L2 to the length L1 described above was 0.248 (another example value "outside the range of 0.2 or below"). Note that on the magnetic disks of Comparative Example 1, by linearly forming both edges 22a, 22b, the ratio of the length L2 to length L1 described above was 0.000.

For the magnetic disks of Examples 1 to 4 and the magnetic disks of Comparative Examples 1 to 3, as one example, the magnetic patterns were observed using an MFM (magnetic force microscope), and for the non-magnetic regions corresponding to the burst signal units in the observed magnetic patterns, the length along the radial direction between both ends of a first edge out of the two direction-of-rotation-side edges and both ends of a second edge (i.e., a length corresponding to the length L1 of the concaves 22 described above: hereinafter referred to as the "length L1a") and the length along the radial direction between both ends of the first edge and the center (i.e., a length corresponding to the length L2 of the concaves 22 described above: hereinafter referred to as the "length L2a") were measured, and the ratio of the length L2a to the length L1a (a value produced by dividing the length L2a by the length L1a) was calculated for the respective disks. The calculation results are shown in FIG. 9. Note that in FIG. 9, the ratios of the lengths L2a to the lengths L1a are expressed for the case where lengths along the radial direction between both ends and a center of the first edge of a non-magnetic region corresponding to a burst signal unit are expressed as positive values when the center is closer to the second edge than both ends and as negative values when the center is further away from the second edge than both ends.

In addition, the PES (Position Error Signal) was measured for the magnetic disks of Examples 1 to 4 and the magnetic disks of Comparative Examples 1 to 3 to judge whether the following precision was favorable or poor for the respective magnetic disks. Calculation results and judgment results of favorable or poor are shown in FIG. 9. Note that the PES values given in FIG. 9 are expressed as values that are relative to the measurement results of the magnetic disks of Comparative Example 1 (i.e., magnetic disks where both direction-of-rotation-side edges 22a, 22b are linearly formed).

As shown in FIG. 9, for the magnetic disks of Examples 1 to 4 where both edges 22a, 22b of the concaves 22 (non-recording regions) that construct the burst signal units were formed so that the ratio of the length L2 to the length L1 is in the range of 0.2 or below, the ratio of the length L2a to the length L1a of the non-magnetic regions in the magnetic pattern is 0.090 or below (absolute values), thereby indicating that the edges are much straighter. On the other hand, for the magnetic disks of Comparative Example 1 where both edges 22a, 22b of the concaves 22 that construct the burst signal units are linearly formed, the ratio of the length L2a to the length L1a of the non-magnetic regions in the magnetic pattern is 0.117 (absolute value), thereby indicating that the edges are less straight. Also, for the magnetic disks of Comparative Examples 2, 3 where both edges 22a, 22b of the concaves 22 (non-recording regions) that construct the burst signal units are formed so that the ratio of the length L2 to the length L1 is outside the range of 0.2 or below, the ratio of the length L2a to the length L1a of the non-magnetic regions of the magnetic patterns is 0.118 or above (absolute values), thereby indicating that the edges are less straight than on the magnetic disks of Comparative Example 1. Accordingly, it can be understood that by forming both edges 22a, 22b so that (i) the ratio of the length L2 to the length L1 of the concaves 22 (non-recording regions) satisfies the condition that the ratio is in the range of 0.2 or below and (ii) the center in the direction of rotation of such edges is positioned closer to the opposite edge than both ends in the direction of rotation, it is possible to sufficiently improve the straightness of the corresponding edges of the non-magnetic regions in a magnetic pattern.

For the magnetic disks of Examples 1 to 4, the PES is 0.90 or below which is at least 0.1 lower than that of the magnetic disks of Comparative Example 1, showing that the following precision is sufficiently improved. On the other hand, for the magnetic disks of Comparative Example 2, the PES is 1.01 which is 0.01 lower than that of the magnetic disks of Comparative Example 1, showing that the following precision is only slightly lower than that of the magnetic disks of Comparative Example 1. Similarly, for the magnetic disks of Comparative Example 3, the PES is 1.26 which is 0.26 lower than that of the magnetic disks of Comparative Example 1, showing that the following precision thereof is much lower than that of the magnetic disks of Comparative Example 1. Accordingly, it can be understood that by forming both edges 22a, 22b so that (i) the ratio of the length L2 to the length L1 of the concaves 22 (non-recording regions) satisfies the condition that the ratio is in the range of 0.2 or below and (ii) the center in the direction of rotation of such edges is positioned closer to the other edge than both ends in the direction of rotation, it is possible to sufficiently improve the PES (i.e., to improve the following precision).

Next, the relationship between the shapes of the concaves 22 (the non-recording regions that construct the burst signal units) inside a burst pattern region Ab and the output level of a burst signal will be described with reference to the drawings.

Magnetic disks of Examples 5 to 8 and Comparative Examples 4 and 5 were manufactured so that for the concaves 22 (non-recording regions) that construct the burst signal units, as one example, both direction-of-rotation-side edges 22a, 22b were linearly formed in the same way as on the conventional magnetic disk 10aZ and both radial-direction-side edges 22c, 22d were arc-shaped in planar form (parabolic in planar form) in the same way as on the magnetic disk 10A described earlier.

Here, as shown in FIG. 10, on the magnetic disks of Example 5, both radial-direction-side edges 22c, 22d were formed so that the ratio of the length L4 along the direction of rotation between both ends and the center of a first edge out of the two edges 22c, 22d to the length L3 along the direction of rotation between both ends of the first edge and both ends of a second edge out of the edges 22c, 22d (i.e., a value produced by dividing the length L4 by the length L3) was 0.048 (one example value "in a range of 0.2 or below"). Also, on the magnetic disks of Example 6, both edges 22c, 22d were formed so that the ratio of the length L4 to the length L3 described above was 0.092 (another example value "in a range of 0.2 or below"). On the magnetic disks of Example 7, both edges 22c, 22d were formed so that the ratio of the length L4 to the length L3 described above was 0.149 (another example value "in a range of 0.2 or below"). Also, on the magnetic disks of Example 8, both edges 22c, 22d were formed so that the ratio of the length L4 to the length L3 described above was 0.199 (another example value "in a range of 0.2 or below").

On the magnetic disks of Comparative Example 4, both edges 22c, 22d were formed so that the ratio of the length L4 to the length L3 described above was 0.225 (one example value that is "outside a range of 0.2 or below"). In addition, on the magnetic disks of Comparative Example 5, both edges 22c, 22d were formed so that the ratio of the length L4 to the length L3 described above was 0.252 (another example value that is "outside a range of 0.2 or below").

For the magnetic disks of Examples 5 to 8 and the magnetic disks of Comparative Examples 1, 4, 5, as one example, the magnetic patterns were observed using an MFM (magnetic force microscope), and for the non-magnetic regions corresponding to the burst signal units in the observed magnetic patterns, the length along the direction of rotation between both ends of a first edge out of the two radial-direction-side edges and both ends of a second edge (i.e., a length corresponding to the length L3 of the concaves 22 described above: hereinafter referred to as the "length L3a") and the length along the direction of rotation between both ends and the center of the first edge (i.e., a length corresponding to the length L4 of the concaves 22 described above: hereinafter referred to as the "length L4a") were measured, and the ratio of the length L4a to the length L3a (a value produced by dividing the length L4a by the length L3a) was calculated for the respective disks. The calculation results are shown in FIG. 10. Note that in FIG. 10, the ratios of the lengths L4a to the lengths L3a are expressed for the case where lengths along the direction of rotation between both ends and a center of the first edge of a non-magnetic region corresponding to a burst signal unit are expressed as positive values when the center is closer to the second edge than both ends and as negative values when the center is further away from the second edge.

In addition, the output level of a signal during the reading of burst signals was measured for the magnetic disks of Examples 5 to 8 and the magnetic disks of Comparative Examples 1, 4, 5 to judge whether the burst output was favorable or poor for the respective magnetic disks. Calculation results and judgment results of favorable or poor are shown in FIG. 10. Note that the values of the burst output given in FIG. 10 are expressed as values that are relative to the measurement results of the magnetic disks of Comparative Example 1 (i.e., magnetic disks where both radial-direction-side edges 22c, 22d are linearly formed).

As shown in FIG. 10, for the magnetic disks of Examples 5 to 8 where both edges 22c, 22d of the concaves 22 (non-recording regions) that construct the burst signal units were formed so that the ratio of the length L4 to the length L3 is in the range of 0.2 or below, the ratio of the length L4a to the length L3a of the non-magnetic regions in the magnetic pattern is 0.087 or below (absolute values), thereby indicating that the edges are much straighter. On the other hand, for the magnetic disks of Comparative Example 1 where both edges 22c, 22d of the concaves 22 that construct the burst signal units were linearly formed, the ratio of the length L4a to the length L3a of the non-magnetic regions in the magnetic pattern is 0.119 (absolute value), thereby indicating that the edges are less straight. Also, for the magnetic disks of Comparative Examples 4, 5 where both edges 22c, 22d of the concaves 22 (non-recording regions) that construct the burst signal units were formed so that the ratio of the length L4 to the length L3 is outside the range of 0.2 or below, the ratio of the length L4a to the length L3a of the non-magnetic regions in the magnetic patterns is 0.118 or above (absolute values), thereby indicating that the edges are as straight as or are less straight than on the magnetic disks of Comparative Example 1. Accordingly, it can be understood that by forming both edges 22c, 22d so that (i) the ratio of the length L4 to the length L3 of the concaves 22 (non-recording regions) satisfies the condition that the ratio is in the range of 0.2 or below and (ii) the center in the radial direction of such edges is positioned closer to the opposite edge than both ends in the radial direction, it is possible to sufficiently improve the straightness of the corresponding edges of the non-magnetic regions in a magnetic pattern.

For the magnetic disks of Examples 5 to 8, the burst output is a level that is at least 1.04 times higher than the burst output of the magnetic disks of Comparative Example 1. On the other hand, for the magnetic disks of Comparative Example 4, the burst output falls to 0.99 times the burst output of the magnetic disks of Comparative Example 1. Similarly, for the magnetic disks of Comparative Example 5, the burst output falls to 0.92 times the burst output of the magnetic disks of Comparative Example 1. Accordingly, it can be understood that by forming both edges 22c, 22d so that (i) the ratio of the length L4 to the length L3 of the concaves 22 (non-recording regions) satisfies the condition that the ratio is in the range of 0.2 or below and (ii) the center in the radial direction of such edges is positioned closer to the other edge than both ends in the radial direction, it is possible to sufficiently improve the burst output.

In this way, according to the magnetic disk 10A and the hard disk drive 1 equipped with the magnetic disk 10A, the "burst signal units" for the present invention are formed of non-recording regions (the concaves 22) so that for at least one out of both direction-of-rotation-side edges 22a, 22b (in the above examples, both edges), the center in the direction of rotation is positioned closer to the opposite edge than both ends in the direction of rotation and so that the ratio of the length L2 along the radial direction between both ends of a first edge (for example, the edge 22a) and the center to the length L1 along the radial direction between both ends of the first edge described above (for example, the edge 22a) and both ends of a second edge (in this example, the edge 22b) is in a range of 0.2 or below (in this example, 0.098). By doing so, according to the magnetic disk 10A and the hard disk drive 1 equipped with the magnetic disk 10A, since it is possible to avoid a situation where both direction-of-rotation-side edges 32a, 32b of the non-magnetic regions 32 that construct the burst signal units in the magnetic pattern 30 become rounded, such edges can be made much straighter. Therefore, according to the magnetic disk 10A and the hard disk drive 1 that uses the same, it is possible to obtain a burst signal of sufficiently high precision. As a result, it is possible to sufficiently improve the following precision, and therefore possible to carry out highly precise tracking servo control.

Also, according to the magnetic disk 10A and the hard disk drive 1 equipped with the magnetic disk 10A, the "burst signal units" for the present invention are formed of non-recording regions (the concaves 22) so that for at least one out of both radial-direction-side edges 22c, 22d (in the above examples, both edges), the center in the radial direction is positioned closer to the opposite edge than both ends in the radial direction and so that the ratio of the length L4 along the direction of rotation between both ends of a first edge (for example, the edge 22c) and the center to the length L3 along the direction of rotation between both ends of the first edge described above (for example, the edge 22c) and both ends of a second edge (in this example, the edge 22d) is in a range of 0.2 or below (in this example, 0.149). By doing so, according to the magnetic disk 10A and the hard disk drive 1 equipped with the magnetic disk 10A, since it is possible to avoid a situation where both radial-direction-side edges 32c, 32d of the non-magnetic regions 32 that construct the burst signal units in the magnetic pattern 30 become rounded, such edges can be made much straighter. Therefore, according to the magnetic disk 10A and the hard disk drive 1, it is possible to reliably read the burst signal units in synchronization with a base clock for reading servo signals. As a result, it is possible to obtain a burst signal with a sufficiently high output level and therefore possible to carry out highly precise tracking servo control.

In addition, according to the magnetic disk 10A and the hard disk drive 1 equipped with the magnetic disk 10A, by constructing the burst signal units (the concaves 22) by forming one edge so as to gradually approach the opposite edge from both ends thereof toward the center, unlike for example a construction where parts closer to the ends than the center of the first edge described above are linearly formed in the same way as on a conventional magnetic disk and only the center of the first edge is closer to the opposite edge, it is possible to avoid a situation where the corresponding edge in the magnetic pattern 30 is not straight due to parts closer to the ends than the center of such edge in the magnetic pattern 30 being further apart from the opposite edge. This means that the straightness of the edges in the magnetic pattern 30 can be reliably improved.

Also, according to the stamper 40A constructed so as to be capable of manufacturing the magnetic disk 10A, by forming the concave/convex pattern 40 including the concaves 42 that are formed corresponding to the recording regions (the convexes 21) of the concave/convex pattern 20 of the magnetic disk 10A described above and the convexes 41 formed corresponding to the non-recording regions (the concaves 22) of the concave/convex pattern 20 of the magnetic disk 10A, it is possible to easily manufacture, by imprinting or the like, a magnetic disk 10A where the edges 32a to 32d of the non-magnetic regions 32 that construct the burst signal units in the magnetic pattern 30 are sufficiently straight.

Next, another embodiment of a magnetic recording medium and a recording/reproducing apparatus according to the present invention will be described with reference to the drawings. Note that component elements that have the same functions as those of the magnetic disk 10A described above and the hard disk drive 1 equipped with the magnetic disk 10A have been assigned the same reference numerals and description thereof has been omitted.

The magnetic disk 10B shown in FIG. 11 is a discrete track medium (one example of a patterned medium) as another example of a magnetic recording medium according to the present invention, and in the same way as the magnetic disk 10A described earlier, the magnetic disk 10B is formed in an overall disk shape and is attached to the rotation shaft of the motor 2. On the magnetic disk 10B, in place of the burst patterns (servo patterns 20s) on the magnetic disk 10A, burst patterns, in which a plurality of convexes 21 that are rectangular in planar form are formed, are formed inside the burst pattern regions Ab (the burst regions Ab1 to Ab4). By doing so, in the same way as the magnetic disk 10A, the magnetic disk 10B is constructed so that burst signals for correcting the position of the magnetic head 3 above the magnetic disk 10B can be obtained.

Figure 12:
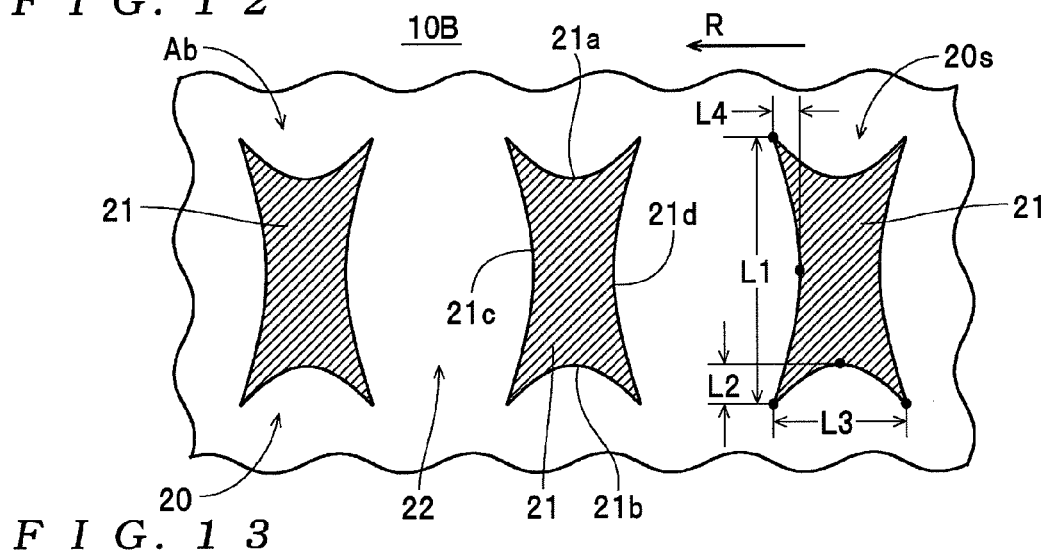
FIG. 12 is a plan view of a burst pattern region on a magnetic disk.

On the magnetic disk 10B, the convexes 21 inside the burst regions Ab1 to Ab4 in each burst pattern region Ab respectively construct the "burst signal units" for the present invention. As shown in FIG. 12, the convexes 21 inside the burst regions Ab1 to Ab4 are formed so that both edges 21a, 21b along the direction of rotation of the magnetic disk 10B (i.e., the direction of the arrow R shown in FIG. 12) are arc-shaped in planar form (parabolic in planar form), and both edges 21c, 21d along the radial direction (the up-down direction in FIG. 12) of the magnetic disk 10B are arc-shaped in planar form.

More specifically, one edge 21a out of both direction-of-rotation-side edges 21a, 21b is formed so as to gradually approach the other edge 21b from both ends in the direction of rotation toward the center so that the center in the direction of rotation is positioned closer to the other edge 21b than both ends in the direction of rotation. The other edge 21b out of both direction-of-rotation-side edges 21a, 21b is also formed so as to gradually approach the other edge 21a from both ends in the direction of rotation toward the center so that the center in the direction of rotation is positioned closer to the edge 21a than both ends in the direction of rotation. In addition, one edge 21c out of both radial-direction-side edges 21c, 21d is formed so as to gradually approach the other edge 21d from both ends in the radial direction toward the center so that the center in the radial direction is positioned closer to the other edge 21d than both ends in the radial direction. Also, the other edge 21d out of both edges 21c, 21d along the radial direction is formed so as to gradually approach the other edge 21c from both ends in the radial direction toward the center, so that the center in the radial direction is positioned closer to the other edge 21c than both ends in the radial direction. Note that the structure for making one edge gradually approach the other edge from both ends thereof toward the center is not limited to a structure where the edge is arc-shaped in planar form as described above and it is possible to use a construction (not shown) where the edge is formed in a "V" shape in planar form.

As one example, for the convexes 21 in the burst regions Ab1 to Ab4, the length L1 in the radial direction corresponds to one track pitch of the data recording tracks and the length L3 in the direction of rotation is formed substantially equal to the length in the direction of rotation of the convexes inside the preamble pattern regions Ap at a position with the same radius. As a result, on the magnetic disk 10B, the length L1 in the radial direction of the convexes 21 is equal to the length in the radial direction of the convexes 21Z inside the burst pattern region AbZ of the conventional magnetic disk 10aZ (the convexes 21Z that construct the burst signal units on the conventional magnetic disk 10aZ) and the length L3 in the direction of rotation of the convexes 21 is equal to the length in the direction of rotation of the convexes 21Z inside the burst pattern region AbZ of the conventional magnetic disk 10aZ (the convexes 21Z that construct the burst signal units on the conventional magnetic disk 10aZ).

The convexes 21 inside the burst regions Ab1 to Ab4 are formed so that the ratio of the length L2 along the radial direction between (i) both ends in the direction of rotation of the direction-of-rotation-side edges 22a, 22b and (ii) centers thereof in the direction of rotation to the length L1 along the radial direction of the radial-direction-side edges 21c, 21d (i.e., the distance between both ends in the radial direction) is 0.101 (i.e., one example value in a range of 0.2 or below). In addition, the convexes 21 inside the burst regions Ab1 to Ab4 are formed so that the ratio of the length L4 along the direction of rotation between (i) both ends in the radial direction of the radial-direction-side edges 22c, 22d and (ii) centers thereof in the radial direction to the length L3 along the direction of rotation of the direction-of-rotation-side edges 21a, 21b (i.e., the distance between both ends in the direction of rotation) is 0.152 (one example value in a range of 0.2 or below).

Figure 13:
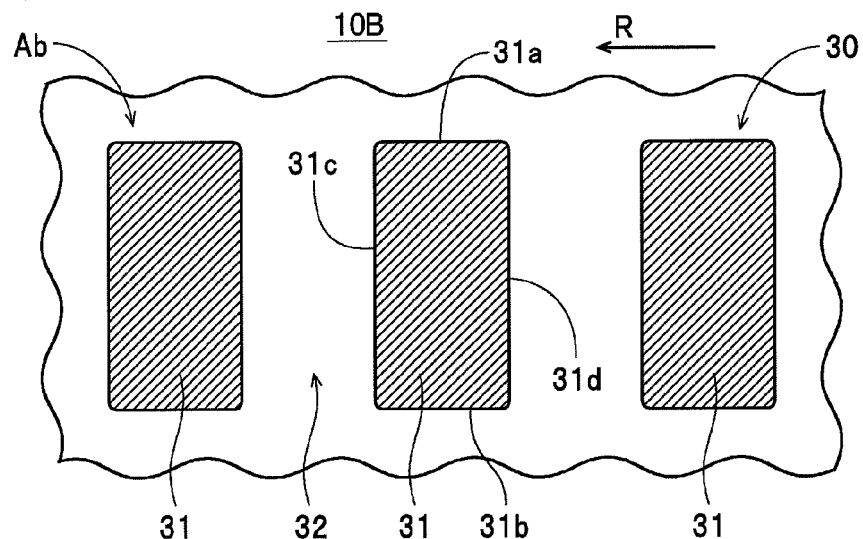
FIG. 13 is a pattern diagram showing the magnetic pattern of a burst pattern region on the magnetic disk.

By doing so, as shown in FIG. 13, in a magnetic pattern 30 (as one example, a pattern observed using an MFM (magnetic force microscope)) of the burst pattern regions Ab on the magnetic disk 10B, the edges 31a to 31d of the magnetic regions 31 corresponding to the convexes 21 were substantially linear without being rounded, so that the respective burst signal units (in this example, the magnetic regions 31) were rectangular in planar form. Since both direction-of-rotation-side edges 31a, 31b of the magnetic regions 31 are straight on the magnetic disk 10B, as described later, it is possible to obtain highly precise burst signals that can sufficiently raise the following precision. Also, on the magnetic disk 10B, since both radial-direction-side edges 31c, 31d of the magnetic regions 31 are straight, the length along the direction of rotation of the burst signal units (the magnetic regions 31) and the length along the direction of rotation of the regions (i.e., the non-magnetic regions 32) between burst signal units that are adjacent in the direction of rotation have a desired ratio (in this example, substantially 1:1). By doing so, as described later, it is possible to obtain a burst signal with a sufficiently high output level.

When manufacturing the magnetic disk 10B described above, the preform used when manufacturing the magnetic disk 10A described above and a stamper 40B shown in FIG. 7 are used. The stamper 40B is another example of a "stamper for manufacturing a magnetic recording medium" according to the present invention and is constructed by forming a concave/convex pattern 40 that can form a mask pattern (a concave/convex pattern: not shown) for forming the concave/convex pattern 20 (the data track patterns 20t and the servo patterns 20s) of the magnetic disk 10B in a resin mask layer so as to be capable of manufacturing the magnetic disk 10B by an imprinting method.

Figure 14:
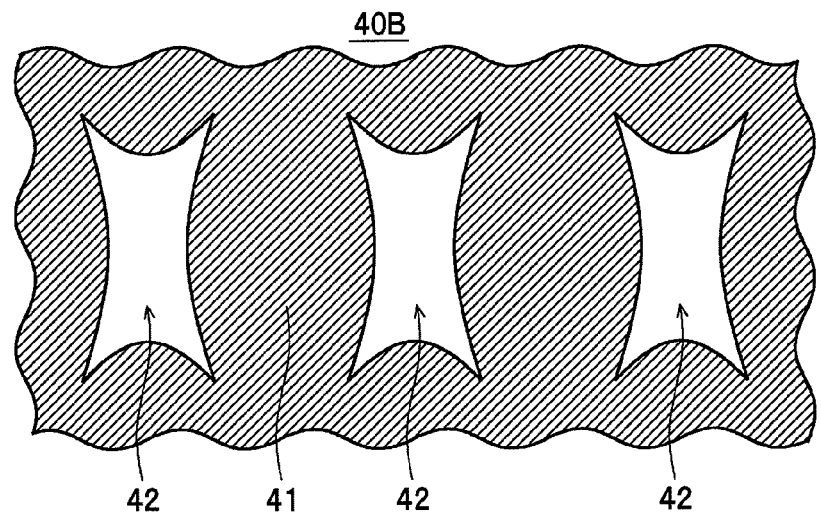
FIG. 14 is a plan view of a region on a stamper that corresponds to a burst pattern region.

The concave/convex pattern 40 of the stamper 40B is formed so as to correspond to the concave/convex pattern 20 of the magnetic disk 10B. More specifically, in the concave/convex pattern 40, the convexes 41 are formed corresponding to the concaves 22 in the concave/convex pattern 20 of the magnetic disk 10B and the concaves 42 are formed corresponding to the convexes 21 in the concave/convex pattern 20 of the magnetic disk 10B. Accordingly, as shown in FIG. 14, on the stamper 40B, in a region corresponding to a burst pattern region Ab of the magnetic disk 10B, the convexes 41 corresponding to the concaves 22 in the burst pattern region Ab of the magnetic disk 10B and the concaves 42 corresponding to the convexes 21 in the burst pattern region Ab are formed. Note that since the method of manufacturing the magnetic disk 10B using the stamper 40B is the same as the method of manufacturing the magnetic disk 10A described earlier, description thereof is omitted.

For the magnetic disk 10B, the relationship between the shapes of the convexes 21 (recording regions that construct the burst signal units) inside the burst pattern regions Ab and the following precision is the same as the relationship between the shapes of the concaves 22 (the non-recording regions that construct the burst signal units) inside the burst pattern regions Ab and the following precision for the magnetic disk 10A described above.

More specifically, magnetic disks of Examples 9 to 12 and Comparative Examples 7, 8 were manufactured so that for the convexes 21 (recording regions) that construct the burst signal units, as one example, both radial-direction-side edges 21c, 21d were linearly formed in the same way as on the conventional magnetic disk 10aZ and both edges 21a, 21b along the direction of rotation were arc-shaped in planar form (parabolic in planar form) in the same way as on the magnetic disk 10B described earlier. Also, magnetic disks of Comparative Example 6 were manufactured by linearly forming the edges 21a to 21d of the convexes 21 (recording regions) that construct the burst signal units in the same way as on the conventional magnetic disk 10bZ.

As shown in FIG. 15, on the magnetic disks of Example 9, both direction-of-rotation-side edges 21a, 21b were formed so that the ratio of the length L2 along the radial direction between both ends of a first edge out of the edges 21a, 21b and the center to the length L1 along the radial direction between both ends of the first edge and both ends of a second edge out of the edges 21a, 21b (i.e., a value produced by dividing the length L2 by the length L1) was 0.050 (one example value "in a range of 0.2 or below"). On the magnetic disks of Example 10, both edges 21a, 21b were formed so that the ratio of the length L2 to the length L1 described above was 0.101 (another example value "in the range of 0.2 or below"). In addition, on the magnetic disks of Example 11, both edges 21a, 21b were formed so that the ratio of the length L2 to the length L1 described above was 0.153 (another example value "in the range of 0.2 or below"). Also, on the magnetic disks of Example 12, both edges 21a, 21b were formed so that the ratio of the length L2 to the length L1 described above was 0.200 (another example value "in the range of 0.2 or below").

On the magnetic disks of Comparative Example 7, both edges 21a, 21b were formed so that the ratio of the length L2 to the length L1 described above was 0.230 (an example value that is "outside the range of 0.2 or below"). Also, on the magnetic disks of Comparative Example 8, both edges 21a, 21b were formed so that the ratio of the length L2 to the length L1 described above was 0.246 (another example value that is "outside the range of 0.2 or below"). Note that on the magnetic disks of Comparative Example 6, by linearly forming both edges 21a, 21b, the ratio of the length L2 to the length L1 described above was 0.000.

For the magnetic disks of Examples 9 to 12 and the magnetic disks of Comparative Examples 6 to 8, as one example, the magnetic patterns were observed using an MFM (magnetic force microscope), and for the magnetic regions corresponding to the burst signal units in the observed magnetic patterns, the length along the radial direction between both ends of a first edge out of the two direction-of-rotation-side edges and both ends of a second edge (a length corresponding to the length L1 of the convexes 21 described above: hereinafter referred to as the "length L1a") and the length along the radial direction between both ends of the first edge and the center (a length corresponding to the length L2 of the convexes 21 described above: hereinafter referred to as the "length L2a") were measured, and the ratio of the length L2a to the length L1a (a value produced by dividing the length L2a by the length L1a) was measured for the respective disks. The calculation results are shown in FIG. 15. Note that in FIG. 15, the ratios of the lengths L2a to the lengths L1a are expressed for the case where lengths along the radial direction between both ends and a center of the first edge of a magnetic region corresponding to a burst signal unit are expressed as positive values when the center is closer to the second edge than both ends and as negative values when the center is further away from the second edge than both ends.

In addition, the PES (Position Error Signal) was measured for the magnetic disks of Examples 9 to 12 and the magnetic disks of Comparative Examples 6 to 8 to judge whether the following precision was favorable or poor for the respective magnetic disks. Calculation results and judgment results of favorable or poor are shown in FIG. 15. Note that the PES given in FIG. 15 are expressed as values that are relative to the measurement results of the magnetic disks of Comparative Example 6 (i.e., magnetic disks where both direction-of-rotation-side edges 21a, 21b are linearly formed).

As shown in FIG. 15, for the magnetic disks of Examples 9 to 12 where both edges 21a, 21b of the convexes 21 (recording regions) that construct the burst signal units are formed so that the ratio of the length L2 to the length L1 is in the range of 0.2 or below, the ratio of the length L2a to the length L1a of the magnetic regions of the magnetic patterns is 0.089 or below (absolute values), thereby indicating that the edges are much straighter. On the other hand, for the magnetic disks of Comparative Example 6 where both edges 21a, 21b of the convexes 21 that construct the burst signal units are linearly formed, the ratio of the length L2a to the length L1a of the magnetic regions of the magnetic patterns is 0.119 (absolute value), thereby indicating that the edges are less straight. Also, for the magnetic disks of Comparative Examples 7, 8 where both edges 21a, 21b of the convexes 21 (recording regions) that construct the burst signal units are formed so that the ratio of the length L2 to the length L1 is outside the range of 0.2 or below, the ratio of the length L2a to the length L1a of the magnetic regions of the magnetic patterns is 0.120 or above (absolute values), thereby indicating that the edges are less straight than on the magnetic disks of Comparative Example 6. Accordingly, it can be understood that by forming both edges 21a, 21b so that (i) the ratio of the length L2 to the length L1 of the convexes 21 (recording regions) satisfies the condition that the ratio is in the range of 0.2 or below and (ii) the center in the direction of rotation of such edges is positioned closer to the opposite edge than both ends in the direction of rotation, it is possible to sufficiently improve the straightness of the corresponding edges of the magnetic regions in a magnetic pattern.

For the magnetic disks of Examples 9 to 12, the PES is 0.89 or below which is at least 0.1 lower than that of the magnetic disks of Comparative Example 6, showing that the following precision is sufficiently improved. On the other hand, for the magnetic disks of Comparative Example 7, the PES is 1.01 which is 0.01 lower than that of the magnetic disks of Comparative Example 6, showing that the following precision is only slightly lower than that of the magnetic disks of Comparative Example 6. Similarly, for the magnetic disks of Comparative Example 8, the PES is 1.24 which is 0.24 lower than that of the magnetic disks of Comparative Example 6, showing that the following precision thereof is much lower than that of the magnetic disks of Comparative Example 6. Accordingly, it can be understood that by forming both edges 21a, 21b so that (i) the ratio of the length L2 to the length L1 of the convexes 21 (recording regions) satisfies the condition that the ratio is in the range of 0.2 or below and (ii) the center in the direction of rotation of such edges is positioned closer to the other edge than both ends in the direction of rotation, it is possible to sufficiently improve the PES (i.e., to improve the following precision).

The relationship between the shapes of the convexes 21 (i.e., the recording regions that construct the burst signal units) inside a burst pattern region Ab and the output level of the burst signal for the magnetic disk 10B is the same as the relationship between the shapes of the concaves 22 (i.e., the non-recording regions that construct the burst signal units) inside a burst pattern region Ab and the output level of the burst signal for the magnetic disk 10A described above.

Magnetic disks of Examples 13 to 16 and Comparative Examples 9 and 10 were manufactured so that for the convexes 21 (recording regions) that construct the burst signal units, as one example, both direction-of-rotation-side edges 21a, 21b were linearly formed in the same way as on the conventional magnetic disk 10aZ and both radial-directionside edges 21c, 21d were arc-shaped in planar form (parabolic in planar form) in the same way as on the magnetic disk 10A described earlier.

Here, as shown in FIG. 16, on the magnetic disks of Example 13, both radial-direction-side edges 22c, 22d were formed so that the ratio of the length L4 along the direction of rotation between both ends and the center of a first edge out of the two edges 22c, 22d to the length L3 along the direction of rotation between both ends of the first edge and both ends of a second edge out of the edges 22c, 22d (i.e., a value produced by dividing the length L4 by the length L3) was 0.044 (one example value "in a range of 0.2 or below"). Also, on the magnetic disks of Example 14, both edges 21c, 21d were formed so that the ratio of the length L4 to the length L3 described above was 0.093 (another example value "in a range of 0.2 or below"). In addition, on the magnetic disks of Example 15, both edges 21c, 21d were formed so that the ratio of the length L4 to the length L3 described above was 0.152 (another example value "in a range of 0.2 or below"). Also, on the magnetic disks of Example 16, both edges 21c, 21d were formed so that the ratio of the length L4 to the length L3 described above was 0.198 (another example value "in a range of 0.2 or below").

On the magnetic disks of Comparative Example 9, both edges 21c, 21d were formed so that the ratio of the length L4 to the length L3 described above was 0.226 (one example value that is "outside a range of 0.2 or below"). Also, on the magnetic disks of Comparative Example 10, both edges 21c, 21d were formed so that the ratio of the length L4 to the length L3 described above was 0.256 (another example value that is "outside a range of 0.2 or below").

For the magnetic disks of Examples 13 to 16 and magnetic disks of Comparative Examples 6, 9, and 10, as one example, the magnetic patterns were observed using an MFM (magnetic force microscope), and for the magnetic regions corresponding to the burst signal units in the observed magnetic patterns, the length along the direction of rotation between both ends of a first edge out of the two radial-direction-side edges and both ends of a second edge (i.e., a length corresponding to the length L3 of the convexes 21 described above: hereinafter referred to as the "length L3a") and the length along the direction of rotation between both ends and the center of the first edge (i.e., a length corresponding to the length L4 of the convexes 21 described above: hereinafter referred to as the "length L4a") were measured, and the ratio of the length L4a to the length L3a (a value produced by dividing the length L4a by the length L3a) was calculated for the respective disks. The calculation results are shown in FIG. 16. Note that in FIG. 16, the ratios of the lengths L4a to the lengths L3a are expressed for the case where lengths along the direction of rotation between both ends and a center of the first edge of a magnetic region corresponding to a burst signal unit are expressed as positive values when the center is closer to the second edge than both ends and as negative values when the center is further away from the second edge.

In addition, the output level of a signal during the reading of burst signals was measured for the magnetic disks of Examples 13 to 16 and the magnetic disks of Comparative Examples 6, 9, 10 to judge whether the burst output was favorable or poor for the respective magnetic disks. Calculation results and judgment results of favorable or poor are shown in FIG. 16. Note that the burst output shown in FIG. 16 is expressed using values that are relative to the measurement results of the magnetic disks of Comparative Example 6 (i.e., magnetic disks where both radial-direction-side edges 21c, 21d are linearly formed).

As shown in FIG. 16, for the magnetic disks of Examples 13 to 16 where both edges 21c, 21d of the convexes 21 (recording regions) that construct the burst signal units are formed so that the ratio of the length L4 to the length L3 is in the range of 0.2 or below, the ratio of the length L4a to the length L3a of the magnetic regions in the magnetic patterns is 0.086 or below (absolute values), thereby indicating that the edges are much straighter. On the other hand, for the magnetic disks of Comparative Example 6 where both edges 21c, 21d of the convexes 21 that construct the burst signal units are linearly formed, the ratio of the length L4a to the length L3a of the magnetic regions in the magnetic patterns is 0.121 (absolute value), thereby indicating that the edges are less straight. Also, for the magnetic disks of Comparative Examples 9, 10 where both edges 21c, 21d of the convexes 21 (recording regions) that construct the-burst signal units are formed so that the ratio of the length L4 to the length L3 is outside the range of 0.2 or below, the ratio of the length L4a to the length L3a of the magnetic regions in the magnetic patterns is 0.118 or above (absolute value), thereby indicating that the edges are as straight as or less straight than on the magnetic disks of Comparative Example 6. Accordingly, it can be understood that by forming both edges 21c, 21d so that (i) the ratio of the length L4 to the length L3 of the convexes 21 (recording regions) satisfies the condition that the ratio is in the range of 0.2 or below and (ii) the center in the radial direction of such edges is positioned closer to the opposite edge than both ends in the radial direction, it is possible to sufficiently improve the straightness of the corresponding edges of the magnetic regions in a magnetic pattern.

For the magnetic disks of Examples 13 to 16, the burst output is a level that is at least 1.04 times higher than the burst output of the magnetic disks of Comparative Example 6. On the other hand, for the magnetic disks of Comparative Example 9, the burst output falls to 0.99 times the burst output of the magnetic disks of Comparative Example 6. Similarly, for the magnetic disks of Comparative Example 10, the burst output falls to 0.91 times the burst output of the magnetic disks of Comparative Example 6. Accordingly, it can be understood that by forming both edges 21c, 21d so that (i) the ratio of the length L4 to the length L3 of the convexes 21 (recording regions) satisfies the condition that the ratio is in the range of 0.2 or below and (ii) the center in the radial direction of such edges is positioned closer to the other edge than both ends in the radial direction, it is possible to improve the burst output.

In this way, according to the magnetic disk 10B and the hard disk drive 1 equipped with the magnetic disk 10B, the "burst signal units" for the present invention are formed of recording regions (the convexes 21) so that for at least one out of both direction-of-rotation-side edges 21a, 21b (in the above examples, both edges), the center in the direction of rotation is positioned closer to the opposite edge than both ends in the direction of rotation and so that the ratio of the length L2 along the radial direction between both ends of a first edge (for example, the edge 21a) and the center to the length L1 along the radial direction between both ends of the first edge described above (in this example, the edge 21a) and both ends of the second edge (in this example, the edge 21b) is in a range of 0.2 or below (as one example, 0.101). By doing so, according to the magnetic disk 10B and the hard disk drive 1 equipped with the magnetic disk 10B, since it is possible to avoid a situation where both direction-of-rotation-side edges 31a, 31b of the magnetic regions 31 that construct the burst signal units in the magnetic pattern 30 become rounded, such edges can be made much straighter. Therefore, according to the magnetic disk 10B and the hard disk drive 1 that uses the same, it is possible to obtain a burst signal of sufficiently high precision. As a result, it is possible to sufficiently improve the following precision, and therefore possible to carry out highly precise tracking servo control.

Also, according to the magnetic disk 10B and the hard disk drive 1 equipped with the magnetic disk 10B, the "burst signal units" for the present invention are formed of recording regions (the convexes 21) so that for at least one out of both radial-direction-side edges 21c, 21d (in the above examples, both edges), the center in the radial direction is positioned closer to the opposite edge than both ends in the radial direction and so that the ratio of the length L4 along the direction of rotation between both ends of a first edge (for example, the edge 21c) and the center to the length L3 along the direction of rotation between both ends of the first edge described above (in this example, the edge 21c) and both ends of the second edge (in this example, the edge 21d) is in a range of 0.2 or below (as one example, 0.152). By doing so, according to the magnetic disk 10B and the hard disk drive 1 equipped with the magnetic disk 10B, since it is possible to avoid a situation where both radial-direction-side edges 31c, 31d of the magnetic regions 31 that construct the burst signal units in the magnetic pattern 30 become rounded, such edges can be made much straighter. Therefore, according to the magnetic disk 10B and the hard disk drive 1 that uses the same, it is possible to reliably read the burst signal units in synchronization with a base clock for reading servo signals. As a result, it is possible to obtain a burst signal with a sufficiently high output level and therefore possible to carry out highly precise tracking servo control.

In addition, according to the magnetic disk 10B and the hard disk drive 1 equipped with the magnetic disk 10B, by constructing the burst signal units (the convexes 21) by forming one edge so as to gradually approach the opposite edge from both ends thereof toward the center, unlike for example a construction where parts closer to the ends than the center of the first edge described above are linearly formed in the same way as on a conventional magnetic disk and only the center of the first edge is closer to the opposite edge, it is possible to avoid a situation where the corresponding edge in the magnetic pattern 30 is not straight due to parts closer to the ends than the center of such edge in the magnetic pattern 30 being further apart from the opposite edge. This means that the straightness of the edges in the magnetic pattern 30 can be reliably improved.

Also, according to the stamper 40B constructed so as to be capable of manufacturing the magnetic disk 10B, by forming the concave/convex pattern 40 including the concaves 42 that are formed corresponding to the recording regions (the convexes 21) of the concave/convex pattern 20 of the magnetic disk 10B described above and the convexes 41 formed corresponding to the non-recording regions (the concaves 22) of the concave/convex pattern 20 of the magnetic disk 10B, it is possible to easily manufacture, by imprinting or the like, a magnetic disk 10B where the edges 31a to 31d of the magnetic regions 31 that construct the burst signal units in the magnetic pattern 30 are sufficiently straight.

Note that the present invention is not limited to the construction and method described above. For example, although the magnetic disk 10A where the four edges 22a to 22d of the concaves 22 that construct the burst signal units are formed so that the center of one out of each facing pair of edges in the edges 22a to 22d is positioned toward the other edge and the magnetic disk 10B where the four edges 21a to 21d of the convexes 21 that construct the burst signal units are formed so that the center of one out of each facing pair of edges in the edges 21a to 21d is positioned toward the other edge have been described, the construction of the magnetic recording medium according to the present invention is not limited to such.

Figure 17:
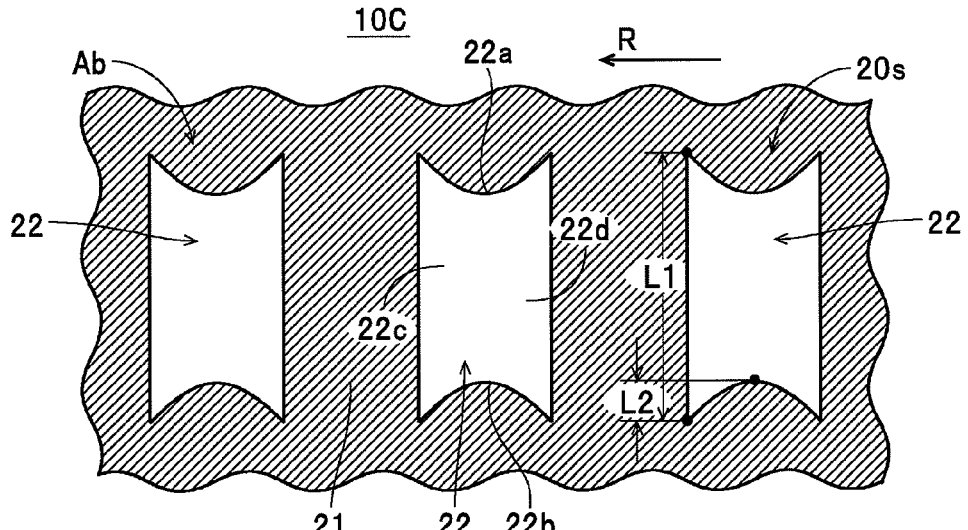
FIG. 17 is a plan view of a burst pattern region on a magnetic disk according to another embodiment.
Figure 18:
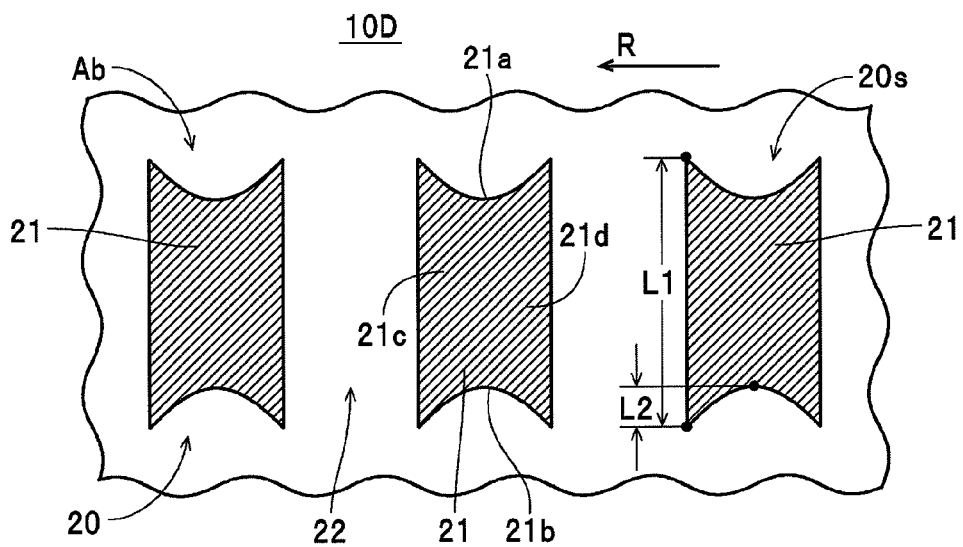
FIG. 18 is a plan view of a burst pattern region on a magnetic disk according to yet another embodiment.

More specifically, when the object is to improve the following precision, like a magnetic disk 10C shown in FIG. 17, out of the four edges 22a to 22d of the concaves 22 that construct the burst signal units, the direction-of-rotation-side edges 22a, 22b may be formed so that the center of one of such facing edges is positioned toward the other edge and the radial-direction-side edges 22c, 22d out of the four edges 22a to 22d may be linearly formed. In the same way, like a magnetic disk 10D shown in FIG. 18, out of the four edges 21a to 21d of the convexes 21 that construct the burst signal units, the direction-of-rotation-side edges 21a, 21b may be formed so that the center of one of such facing edges is positioned toward the other edge and the radial-direction-side edges 21c, 21d out of the four edges 21a to 21d may be linearly formed. For the magnetic disks 10C, 10D that use such constructions, in the same way as the magnetic disks 10A, 10B described earlier, it is possible to make both direction-of-rotation-side edges of the burst signal units in the magnetic pattern linear without rounding, and therefore it is possible to sufficiently raise the following precision.

Figure 19:
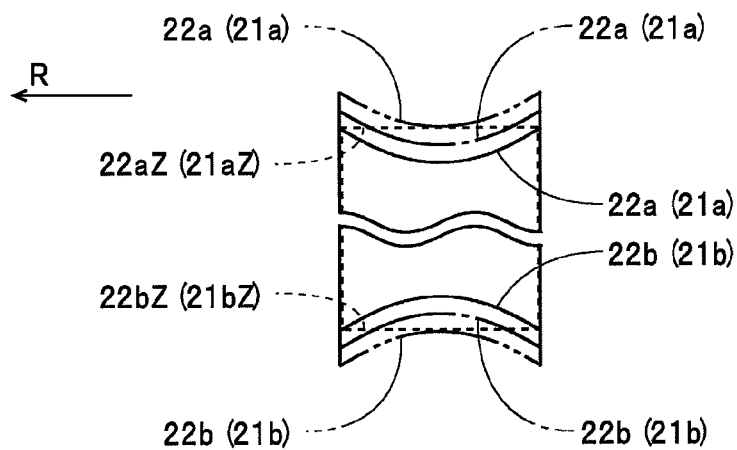
FIG. 19 is a diagram useful in explaining the edges of the burst signal units and the formation positions of such edges.

Note that when the object is to improve the straightness of the direction-of-rotation-side edges in the magnetic pattern 30, the formation positions of edges 22a, 22b, 21a, 21b of the concaves 22 or the convexes 21 that construct the burst signal units can be any out of the positions shown by the solid lines in FIG. 19, the positions shown by the dot-dash lines, and the positions shown by the dot-dot-dash lines. More specifically, it is possible to use any of a construction where as shown by the solid lines in FIG. 19, the edges 22a, 22b, 21a, and 21b are positioned entirely inside the concaves 22Z and the convexes 21Z (the concaves 22Z and the convexes 21Z that construct the burst signal units on the conventional magnetic disk) which are shown by the broken lines in FIG. 19, a construction where as shown by the dot-dash lines in FIG. 19, both ends of the edges 22a, 22b, 21a, and 21b are positioned outside the concaves 22Z and the convexes 21Z and the centers thereof are positioned inside the concaves 22Z and the convexes 21Z, and a construction where as shown by the dot-dot-dash lines in FIG. 19, the edges 22a, 22b, 21a, and 21b are positioned entirely outside the concaves 22Z and the convexes 21Z.

Figure 20:
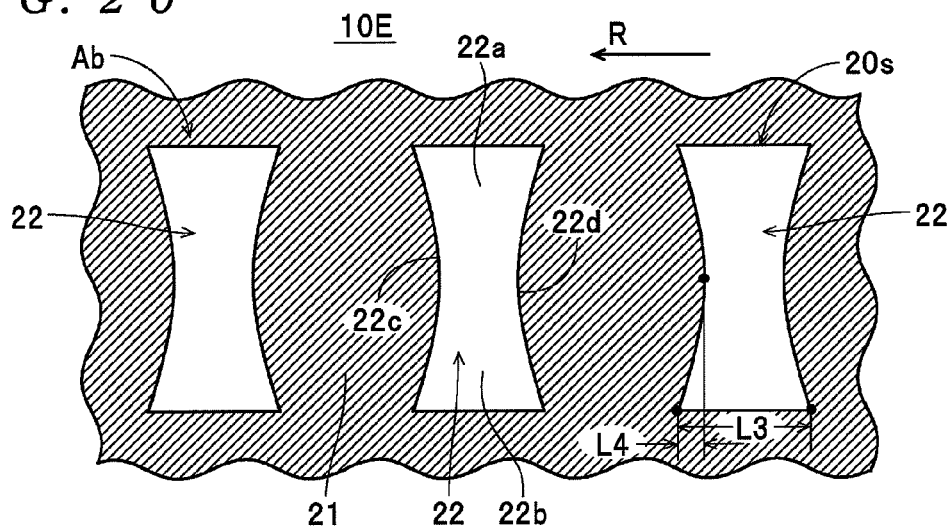
FIG. 20 is a plan view of a burst pattern region of a magnetic disk according to yet another embodiment.
Figure 21:
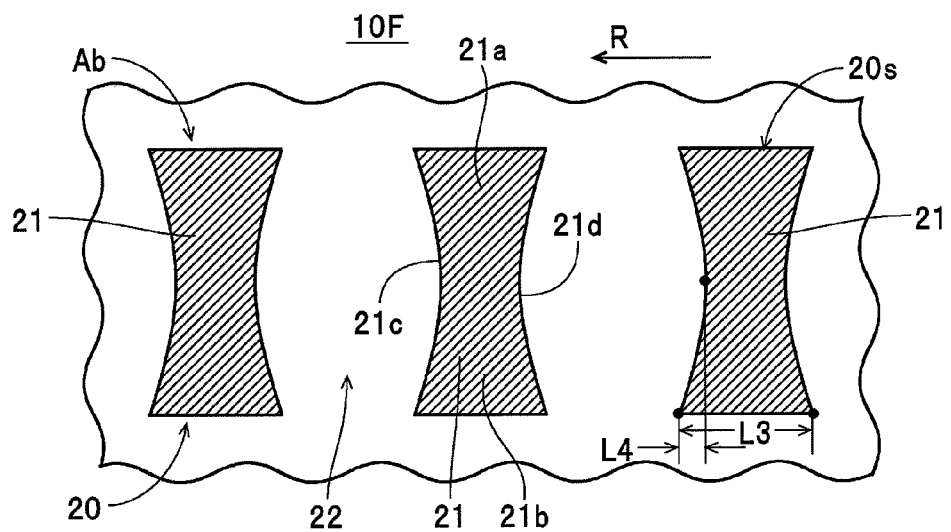
FIG. 21 is a plan view of a burst pattern region of a magnetic disk according to yet another embodiment.

When the object is to raise the output level of the burst signal, like a magnetic disk 10E shown in FIG. 20, the radial-direction-side edges 22c, 22d out of the four edges 22a to 22d of the concaves 22 that construct the respective burst signal units may be formed so that the center of one out of such facing edges is positioned toward the other edge and the direction-of-rotation-side edges 22a, 22b out of the four edges 22a to 22d may be linearly formed. In the same way, like a magnetic disk 10F shown in FIG. 21, the radial-direction-side edges 21c, 21d out of the four edges 21a to 21d of the convexes 21 that construct the respective burst signal units may be formed so that the center of one out of both facing edges is positioned toward the other edge and the direction-of-rotation-side edges 21a, 21b out of the four edges 21a to 21d may be linearly formed. For the magnetic disks 10E, 10F that use such construction, in the same way as the magnetic disks 10A, 10B described earlier, it is possible to make both edges along the radial direction of the burst signal unit in the magnetic pattern straight without rounding, and therefore it is possible to sufficiently raise the output level of the burst signal.

Figure 22:
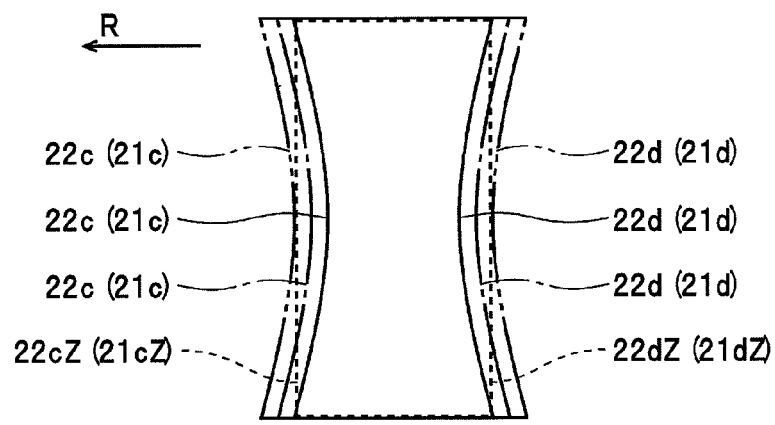
FIG. 22 is a diagram useful in explaining the formation positions of the respective edges of the burst signal units.

Note that when the object is to improve the straightness of the radial-direction-side edges in the magnetic pattern 30, the formation positions of edges 22c, 22d, 21c, 21d of the concaves 22 or the convexes 21 that construct the burst signal units can be any out of the positions shown by the solid lines in FIG. 22, the positions shown by the dot-dash lines, the positions shown by the dot-dot-dash lines, and the like. More specifically, it is possible to use any of a construction where as shown by the solid lines in FIG. 22, the edges 22c, 22d, 21c, and 21d may be positioned entirely inside the concaves 22Z and the convexes 21Z (the concaves 22Z and the convexes 21Z that construct the burst signal units on the conventional magnetic disk) which are shown by the broken lines in FIG. 22, a construction where as shown by the dot-dash lines in FIG. 22, both ends of all of the edges 22c, 22d, 21c, and 21d are positioned outside the concaves 22Z and the convexes 21Z and the centers thereof are positioned inside the concaves 22Z and the convexes 21Z, and a construction where as shown by the dot-dot-dash lines in FIG. 22, the edges 22c, 22d, 21c, and 21d are positioned entirely outside the concaves 22Z and the convexes 21Z.

Figure 23:
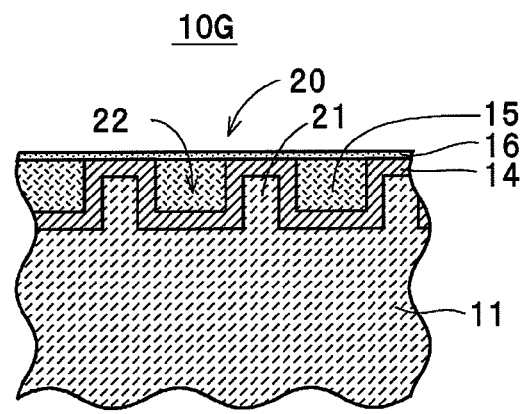
FIG. 23 is a cross-sectional view of a magnetic disk according to yet another embodiment.
Figure 24:
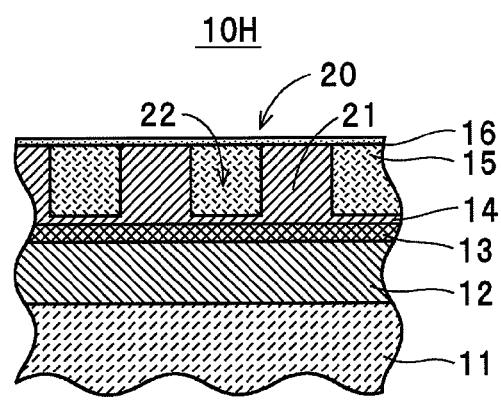
FIG. 24 is a cross-sectional view of a magnetic disk according to yet another embodiment.

In addition, although the magnetic disks 10A, 10B where the entire regions from the protruding end parts to the base end parts of the convexes 21 of the concave/convex pattern 20 (i.e., the data track patterns 20t and the servo patterns 20s) are formed by the magnetic layer 14 (i.e., the magnetic material) have been described as examples, the construction of the magnetic recording medium according to the present invention is not limited to this. More specifically, like a magnetic disk 10G shown in FIG. 23, for example, by forming a thin magnetic layer 14 so as to cover a concave/convex pattern formed in the glass substrate 11 (a concave/convex pattern where the convexes and concaves have the same positional relationship as that of the concave/convex pattern 20), it is possible to construct the concave/convex pattern 20 (i.e., the data track patterns 20t and the servo patterns 20s) of a plurality of convexes 21 whose surfaces are formed of magnetic material and a plurality of concaves 22 whose bottom surfaces are also formed of the magnetic material. Also, like a magnetic disk 10H shown in FIG. 24, it is possible to construct a concave/convex pattern 20 where not only the convexes 21 but also the bottom parts of the concaves 22 are formed of the magnetic layer 14.

Figure 25:
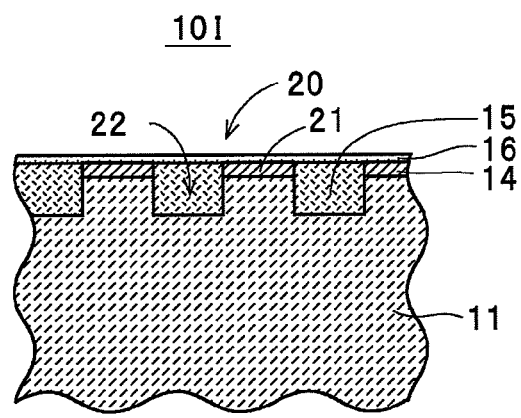
FIG. 25 is a cross-sectional view of a magnetic disk according to yet another embodiment.
Figure 26:
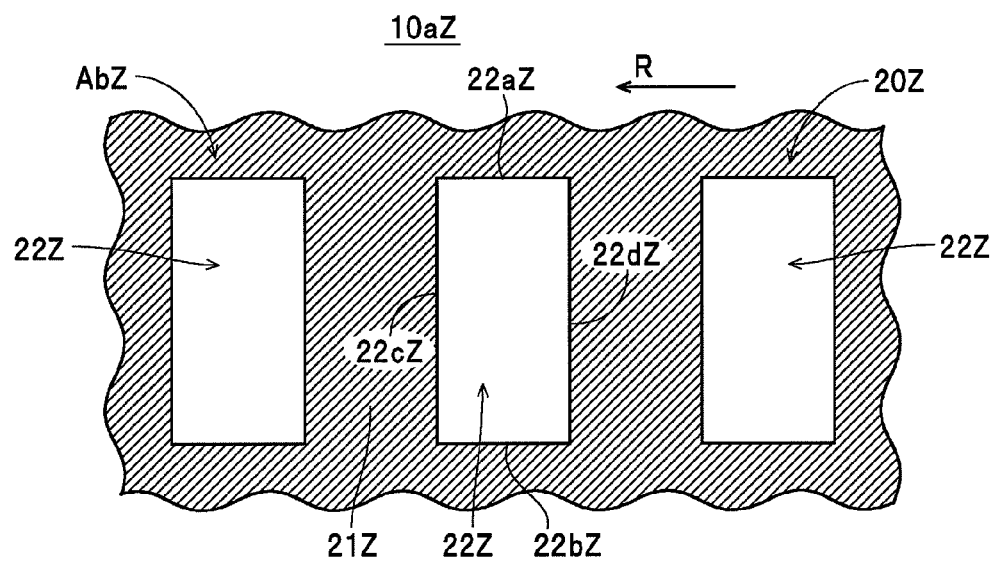
FIG. 26 is a plan view of a burst pattern region on a conventional magnetic disk.
Figure 27:
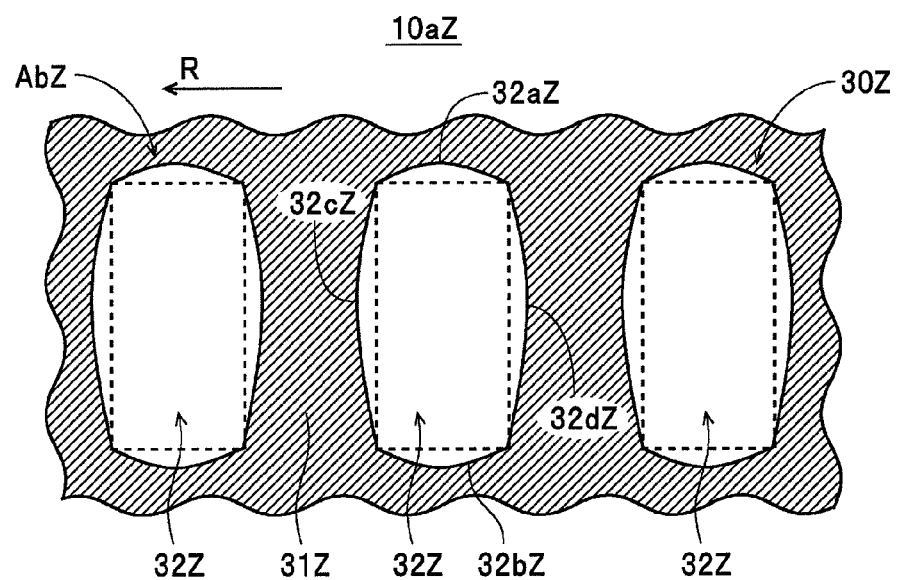
FIG. 27 is a pattern diagram showing the magnetic pattern of the burst pattern region on the conventional magnetic disk.
Figure 28:
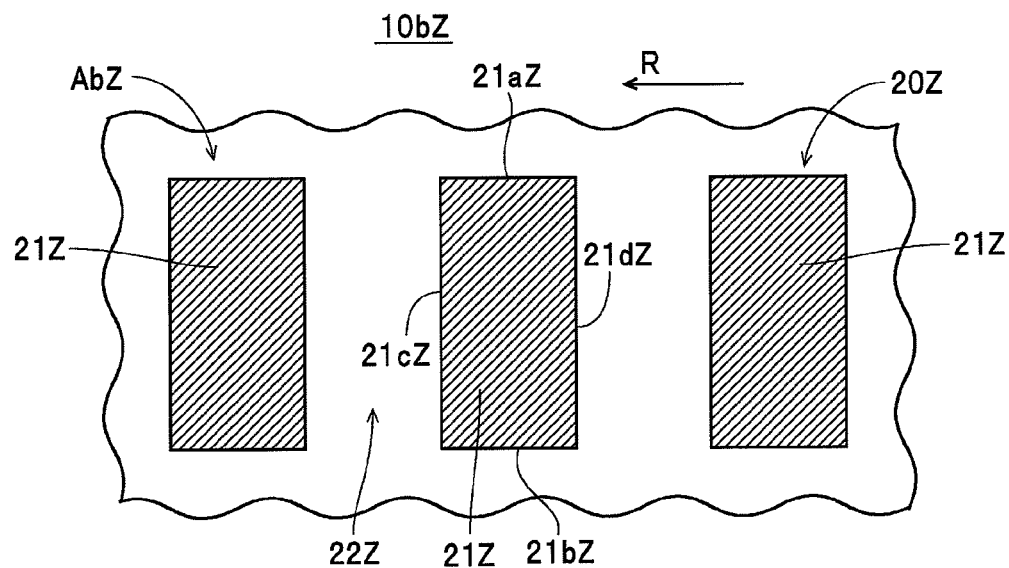
FIG. 28 is a plan view of a burst pattern region on another conventional magnetic disk.
Figure 29:
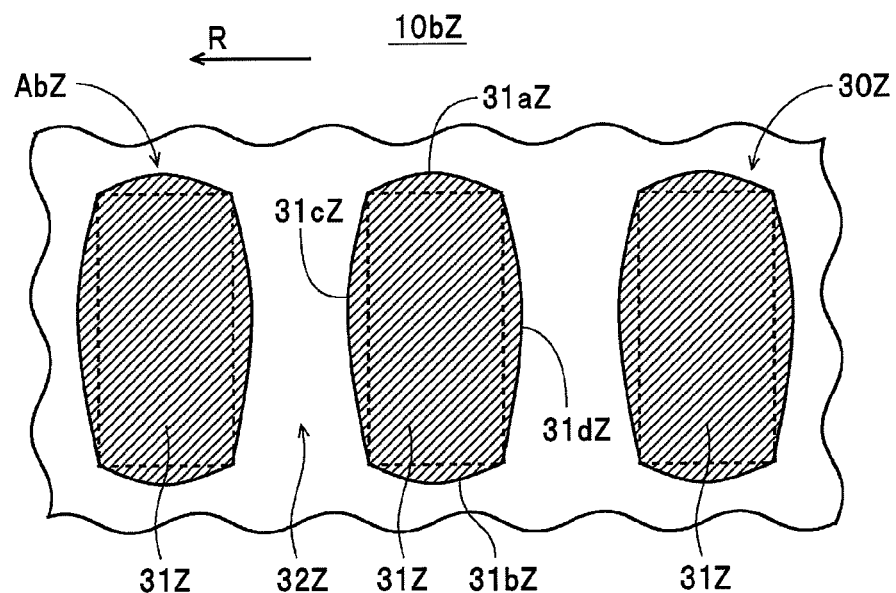
FIG. 29 is a pattern diagram showing the magnetic pattern of a burst pattern region on the other conventional magnetic disk.

As another example, like a magnetic disk 10I shown in FIG. 25, it is also possible to construct the concave/convex pattern 20 so as to include a plurality of convexes 21 where only the protruding end parts of the convexes 21 are formed of the magnetic layer 14 and the base end parts of the convexes 21 are formed of a non-magnetic material or a soft magnetic material (in the illustrated example, the glass substrate 11). Here, for the magnetic disk 10I shown in FIG. 25, although only the protruding end parts of the convexes 21 are formed of the magnetic layer 14, it is possible to use a construction where the magnetic layer 14 is formed on the base surfaces of the concaves 22 between adjacent convexes 21 (a construction where the magnetic layer 14 is not present on the side surfaces of the convexes 21 of the magnetic disk 10G described earlier: not shown).

In addition, it is also possible to construct a magnetic disk (not shown) by filling concaves formed in a layer of non-magnetic material with the magnetic material that construct the magnetic layer 14 described above and setting the positions of the convexes in the layer of the non-magnetic material as the non-recording regions (i.e., regions corresponding to the concaves 22 of the magnetic disk 10 and the like) and positions of the magnetic material filled inside the concaves as the recording regions (i.e., regions corresponding to the convexes 21 of the magnetic disk 10 and the like). It is also possible to construct a magnetic disk (not shown) by selectively modifying desired regions in a layer of magnetic material to form regions whose ability to hold a magnetic signal in a readable manner is lower than that of the periphery thereof or regions constructed so as not to effectively have such ability, setting regions whose ability to hold a magnetic signal in a readable manner is high as recording regions (i.e., regions corresponding to the convexes 21 of the magnetic disk 10 and the like), and setting regions whose ability to hold a magnetic signal in a readable manner is low as non-recording regions (i.e., regions corresponding to the concaves 22 of the magnetic disk 10 and the like).

In addition, although examples have been described where both the data track patterns 20t and the servo patterns 20s are comprised of the concave/convex pattern 20 having convexes 21 and concaves 22, the magnetic recording medium according to the present invention is not limited to such and it is possible to achieve a construction that is capable of recording and reproducing by forming the servo pattern 20s of the concave/convex pattern 20 inside the servo pattern regions As and forming a continuous magnetic film (a smooth magnetic layer 14 with no concaves and convexes) inside the data recording regions At.

What is claimed is:

1. A rotary-type magnetic recording medium where servo patterns are formed in servo pattern regions on at least one surface of a disk-shaped substrate by patterns including recording regions and non-recording regions,
   wherein a plurality of burst signal units that are composed of one of the recording regions and the non-recording regions are formed in burst pattern regions in the servo pattern regions, and
   the burst signal units are formed so that:
   for at least one edge out of both edges along a direction of rotation of the magnetic recording medium, a center in the direction of rotation is positioned closer to the other edge than both ends in the direction of rotation; and
   a ratio of a length along a radial direction of the magnetic recording medium between both ends and the center of the one edge to a length along the radial direction between both ends of the one edge and both ends of the other edge is in a range of 0.2 or below.

2. A magnetic recording medium according to claim 1, wherein the burst signal units are composed of the recording regions.

3. A magnetic recording medium according to claim 1, wherein the burst signal units are composed of the non-recording regions.

4. A magnetic recording medium according to claim 1, wherein the burst signal units are formed so that the one edge gradually approaches the other edge from both ends thereof toward the center thereof.

5. A recording/reproducing apparatus comprising:
   a magnetic recording medium according to claim 1; and
   a control unit that executes a tracking servo control process based on a servo signal read from the servo pattern regions of the magnetic recording medium.

6. A stamper for manufacturing a magnetic recording medium,
   wherein a concave/convex pattern with concaves formed corresponding to the recording regions in the patterns of a magnetic recording medium according to claim 1 and convexes formed corresponding to the non-recording regions in the patterns of the magnetic recording medium is formed on the stamper.

7. A rotary-type magnetic recording medium where servo patterns are formed in servo pattern regions on at least one surface of a disk-shaped substrate by patterns including recording regions and non-recording regions, wherein a plurality of burst signal units that are composed of one of the recording regions and the non-recording regions are formed in burst pattern regions in the servo pattern regions, and the burst signal units are formed so that:

for at least one edge out of both edges along a radial direction of the magnetic recording medium, a center in the radial direction is positioned closer to the other edge than both ends in the radial direction, and a ratio of a length along a direction of rotation of the magnetic recording medium between both ends and the center of the one edge to a length along the direction of rotation between both ends of the one edge and both ends of the other edge is in a range of 0.2 or below.

8. A magnetic recording medium according to claim 7, wherein the burst signal units are composed of the recording regions.

9. A magnetic recording medium according to claim 7, wherein the burst signal units are composed of the non-recording regions.

10. A magnetic recording medium according to claim 7, wherein the burst signal units are formed so that the one edge gradually approaches the other edge from both ends thereof toward the center thereof.

11. A recording/reproducing apparatus comprising:

a magnetic recording medium according to claim 7; and a control unit that executes a tracking servo control process based on a servo signal read from the servo pattern regions of the magnetic recording medium.

12. A stamper for manufacturing a magnetic recording medium, wherein a concave/convex pattern with concaves formed corresponding to the recording regions in the patterns of a magnetic recording medium according to claim 7 and convexes formed corresponding to the non-recording regions in the patterns of the magnetic recording medium is formed on the stamper.

* * * * *

UNITED STATES PATENT AND TRADEMARK OFFICE
CERTIFICATE OF CORRECTION

| | |
|---|---|
| PATENT NO. | : 7,656,606 B2 |
| APPLICATION NO. | : 11/944485 |
| DATED | : February 2, 2010 |
| INVENTOR(S) | : K. Nakada et al. |

Page 1 of 1

It is certified that error appears in the above-identified patent and that said Letters Patent is hereby corrected as shown below:

On the Title Page, under Inventors (75), in the printed patent, "Kasuyuki Nakada" should be --Katsuyuki Nakada--.

Signed and Sealed this

Thirty-first Day of August, 2010

David J. Kappos
*Director of the United States Patent and Trademark Office*